(12) United States Patent
Frye et al.

(10) Patent No.: US 10,046,670 B2
(45) Date of Patent: Aug. 14, 2018

(54) VEHICLE SEAT

(71) Applicant: Faurecia Automotive Seating, LLC, Auburn Hills, MI (US)

(72) Inventors: Dale J Frye, West Olive, MI (US); Jeffery T Bonk, Chesterfield, MI (US); Timothy L Moulton, Newport, RI (US); Jared A Judson, Medford, MA (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 0 days.

(21) Appl. No.: 15/079,581

(22) Filed: Mar. 24, 2016

(65) Prior Publication Data
US 2016/0280094 A1 Sep. 29, 2016

Related U.S. Application Data

(60) Provisional application No. 62/212,186, filed on Aug. 31, 2015, provisional application No. 62/137,679, filed on Mar. 24, 2015.

(51) Int. Cl.
*B60N 2/02* (2006.01)
*B60R 21/015* (2006.01)
*B60N 2/00* (2006.01)

(52) U.S. Cl.
CPC ......... *B60N 2/0244* (2013.01); *B60N 2/0228* (2013.01); *B60R 21/01516* (2014.10); *B60N 2/002* (2013.01); *B60N 2002/0256* (2013.01); *B60N 2002/0268* (2013.01)

(58) Field of Classification Search
CPC .............. B60N 2/002; B60N 2002/446; B60N 2/0244; B60N 2/0228; B60N 2002/0256; B60N 2002/0268; B60R 21/01516; B60R 21/01554
See application file for complete search history.

(56) References Cited

U.S. PATENT DOCUMENTS

| | | | |
|---|---|---|---|
| 6,401,021 B1* | 6/2002 | Scally | B60N 2/0248 296/65.01 |
| 6,460,934 B1* | 10/2002 | Langer | B60N 2/0228 297/344.1 |
| 6,509,747 B2* | 1/2003 | Nagai | B60N 2/002 180/273 |
| 7,390,982 B2* | 6/2008 | Schmidt | B60N 2/0228 200/5 R |
| 7,575,085 B2* | 8/2009 | Kamizono | B60R 21/01532 180/273 |
| 7,667,345 B2 | 2/2010 | Budweg et al. | |
| 8,960,757 B2* | 2/2015 | Otake | B60N 2/065 296/65.13 |
| 9,283,869 B2* | 3/2016 | Yamamoto | B60N 2/0228 |
| 9,908,440 B2* | 3/2018 | Sugioka | B60N 2/0244 |
| 2006/0217864 A1* | 9/2006 | Johnson | B60N 2/002 701/45 |
| 2007/0063567 A1* | 3/2007 | Nakaya | B60N 2/0232 297/362.11 |

(Continued)

*Primary Examiner* — Jason R Holloway
(74) *Attorney, Agent, or Firm* — Barnes & Thornburg LLP

(57) ABSTRACT

A vehicle seat is adapted to be moved relative to a floor of a vehicle. The seat includes a seat bottom that can be moved relative to the floor and a seat back that can be moved relative to the seat bottom.

25 Claims, 28 Drawing Sheets

(56) References Cited

U.S. PATENT DOCUMENTS

| | | | |
|---|---|---|---|
| 2011/0316318 A1* | 12/2011 | Yamaguchi | B60N 2/002 297/410 |
| 2014/0084656 A1* | 3/2014 | Hozumi | B60N 2/0244 297/344.1 |
| 2014/0265477 A1* | 9/2014 | Yetukuri | B60N 2/0228 297/217.3 |
| 2015/0108818 A1* | 4/2015 | Yamamoto | B60N 2/0228 297/452.1 |
| 2017/0101032 A1* | 4/2017 | Sugioka | B60N 2/0244 |

* cited by examiner

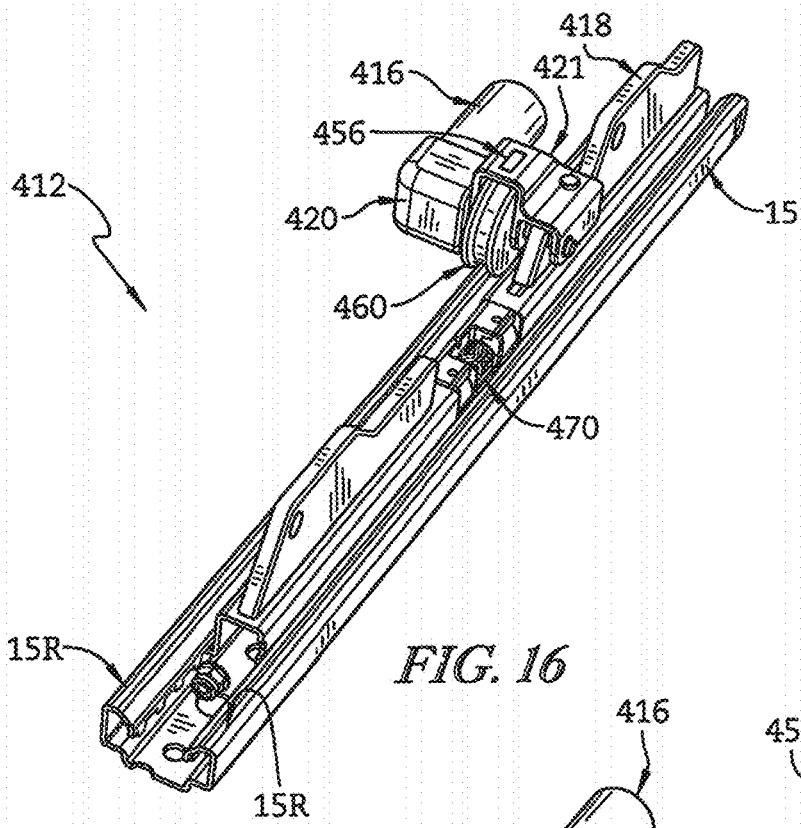
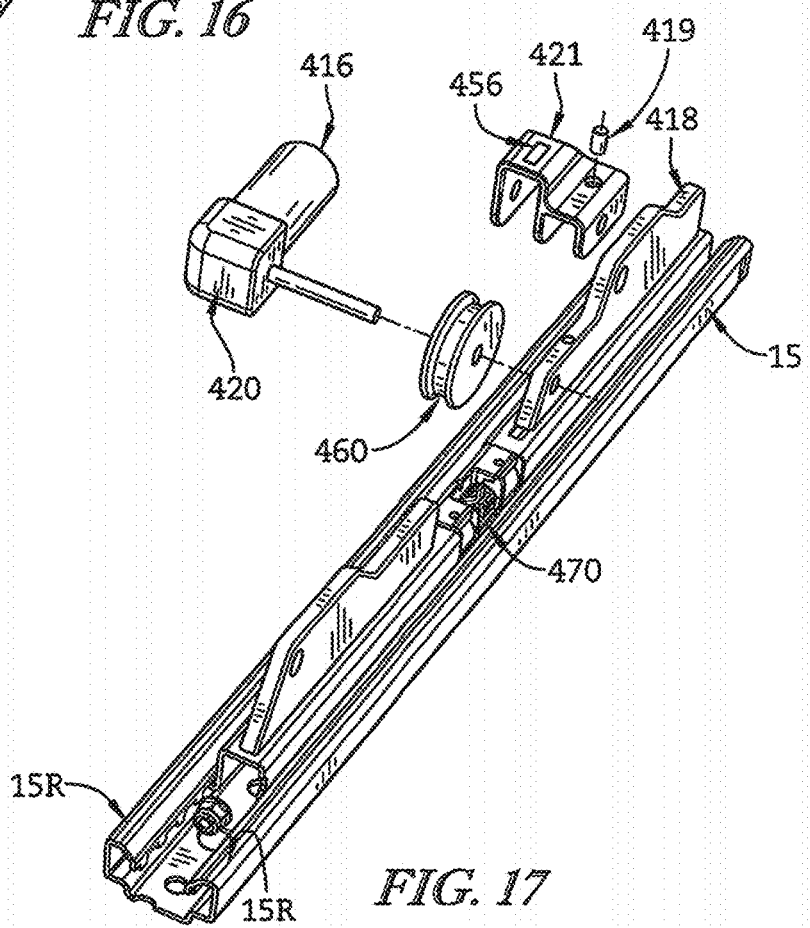

VEHICLE SEAT

PRIORITY CLAIM

This application claims priority under 35 U.S.C. § 119(e) to U.S. Provisional Application Ser. No. 62/137,679 filed 24 Mar. 2015, and U.S. Provisional Application Ser. No. 62/212,186, filed 31 Aug. 2015, each of which is expressly incorporated by reference herein.

BACKGROUND

The present disclosure relates to a vehicle seat, and in particular to a vehicle seat movable within a passenger vehicle. More particularly, the present disclosure relates to a powered vehicle seat.

SUMMARY

According to the present disclosure, a vehicle seat is mounted to a floor in a passenger vehicle and is adapted to move within the passenger vehicle to a variety of positions. In illustrative embodiments, the vehicle seat includes a seat bottom mounted to a track to slide along the track relative to the floor, a seat back mounted to the seat bottom to pivot relative to the seat bottom, and a seat motion system coupled to the seat bottom and the seat back. The seat motion system provides powered means for rearranging the vehicle seat within the passenger vehicle by sliding the seat bottom along the floor and/or pivoting the seat back relative to the seat bottom.

In illustrative embodiments, the seat motion system includes a slide mover that moves the seat bottom along the floor and a controller coupled to the slide mover. The slide mover may take a number of different forms. The controller directs operation of the motor based on force signals received from sensors that detect if a user is pushing or pulling on the seat back or seat bottom so that the vehicle seat glides along the floor when gently pushed or pulled by a user without requiring the user to manually overcome all frictional and gravitational forces resisting movement of the vehicle seat.

In illustrative embodiments, the controller is configured to process signals received from the sensors in order to operate the slide mover effectively. In some examples, the controller may multiply the force signals by different coefficients depending on whether the vehicle seat is pushed forward or pulled backward. In some examples, the controller may multiply the force signals by different coefficients depending on whether the force signals are associated with a force applied to the seat bottom or the seat back. In some examples, the controller may multiply the force signals by different coefficients depending on the location of the vehicle seat relative to the track.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a side perspective view of a passenger vehicle showing a driver seated in a vehicle seat mounted to a floor for powered movement along the floor and diagrammatically showing that the vehicle seat includes a seat motion system adapted to provide means for rearranging the vehicle seat within the passenger vehicle by sliding a seat bottom of the vehicle seat along the floor and/or pivoting a seat back of the vehicle seat relative to the seat bottom when the seat bottom or seat back are gently pushed or pulled by a user without requiring the user to manually overcome all frictional and gravitational forces resisting movement of the vehicle seat;

FIG. 2 is diagrammatic view of the second-row vehicle seat of FIG. 1 showing that the seat bottom is coupled to a track mounted to the floor to slide on the track relative to the floor and showing that the seat motion system includes a slide mover configured to move the seat bottom along the track, a sensor unit configured to detect forces applied to front and back sides of the seat back, and a controller coupled to each of the other components of the seat motion system;

FIG. 3 is a perspective view of a first illustrative vehicle seat in accordance with the present disclosure showing that the slide mover includes left and right side assemblies;

FIG. 4 is a detail perspective view of the right side assembly of the slide mover shown in FIG. 3 showing that the right side assembly includes a threaded rod adapted to be coupled to the floor and a motor adapted to be coupled to the seat bottom via a bracket, FIG. 5 is an exploded assembly perspective view of the right side assembly of FIG. 4 showing that the right side assembly includes a worm gear and a worm wheel housed in the bracket and showing that the worm gear is coupled to the motor to be driven by the motor and the worm wheel has external threads intermeshed with the worm gear and internal threads intermeshed with the threaded rod;

Figure 1:
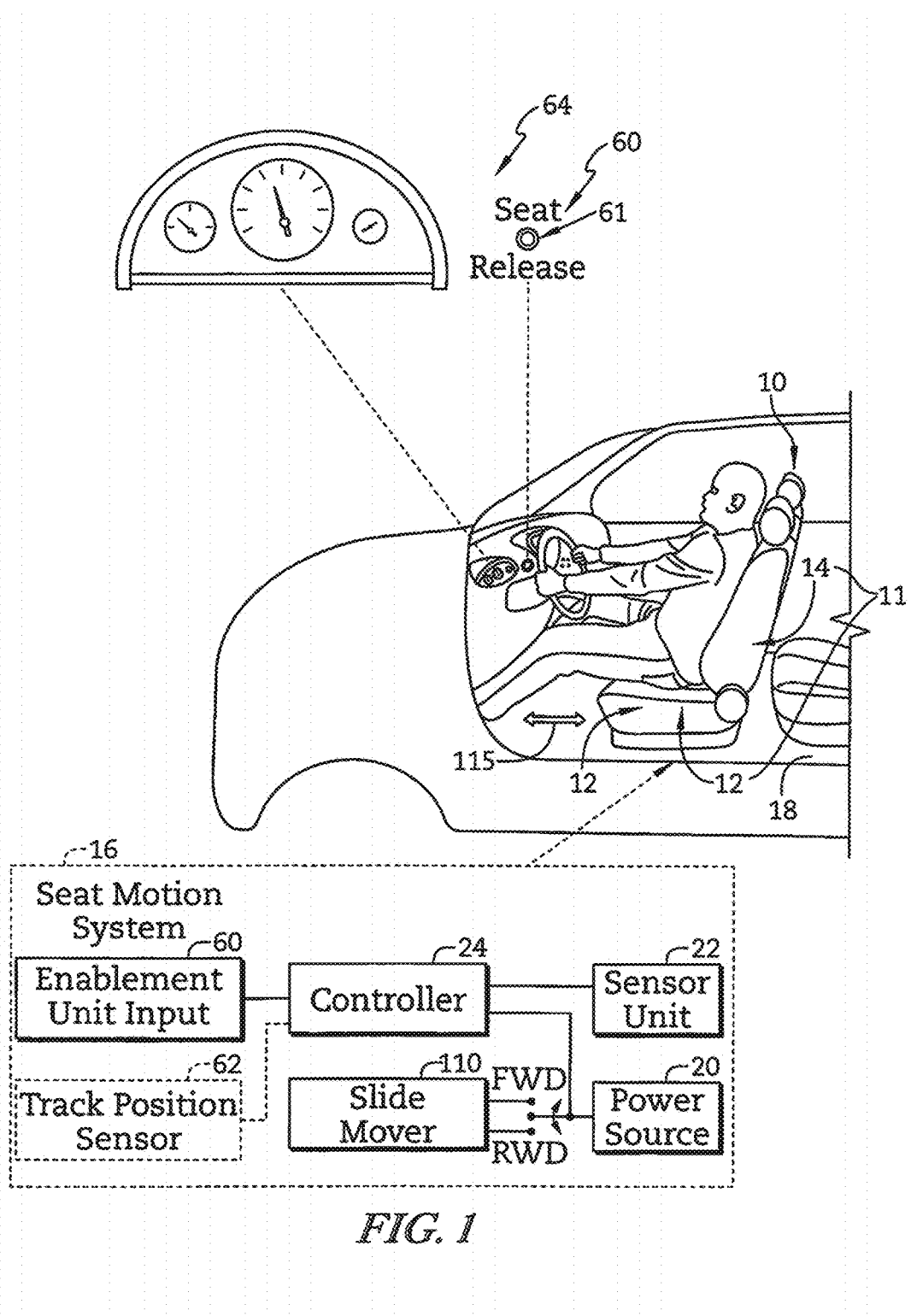
Figure 2:
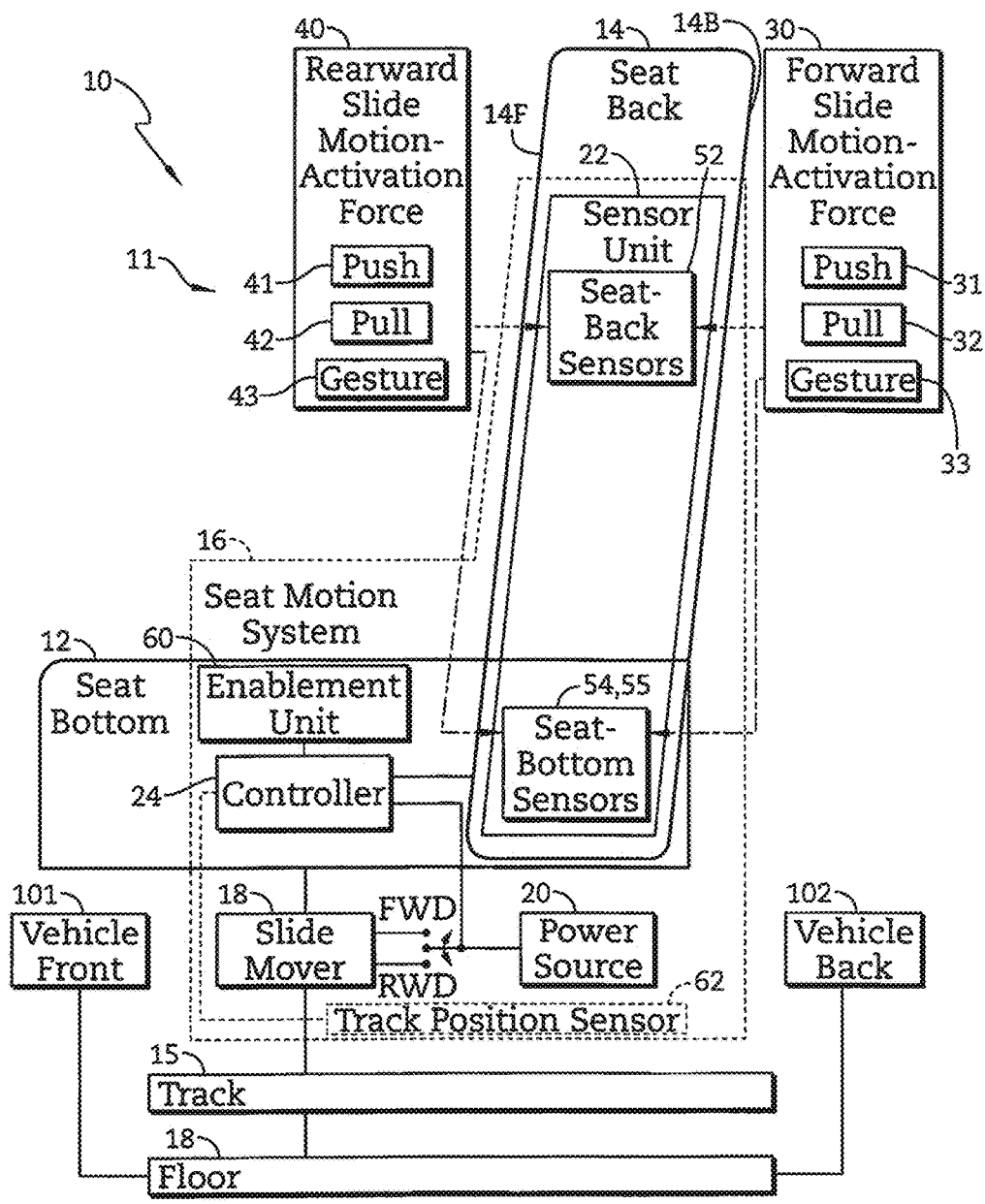
Figure 10:
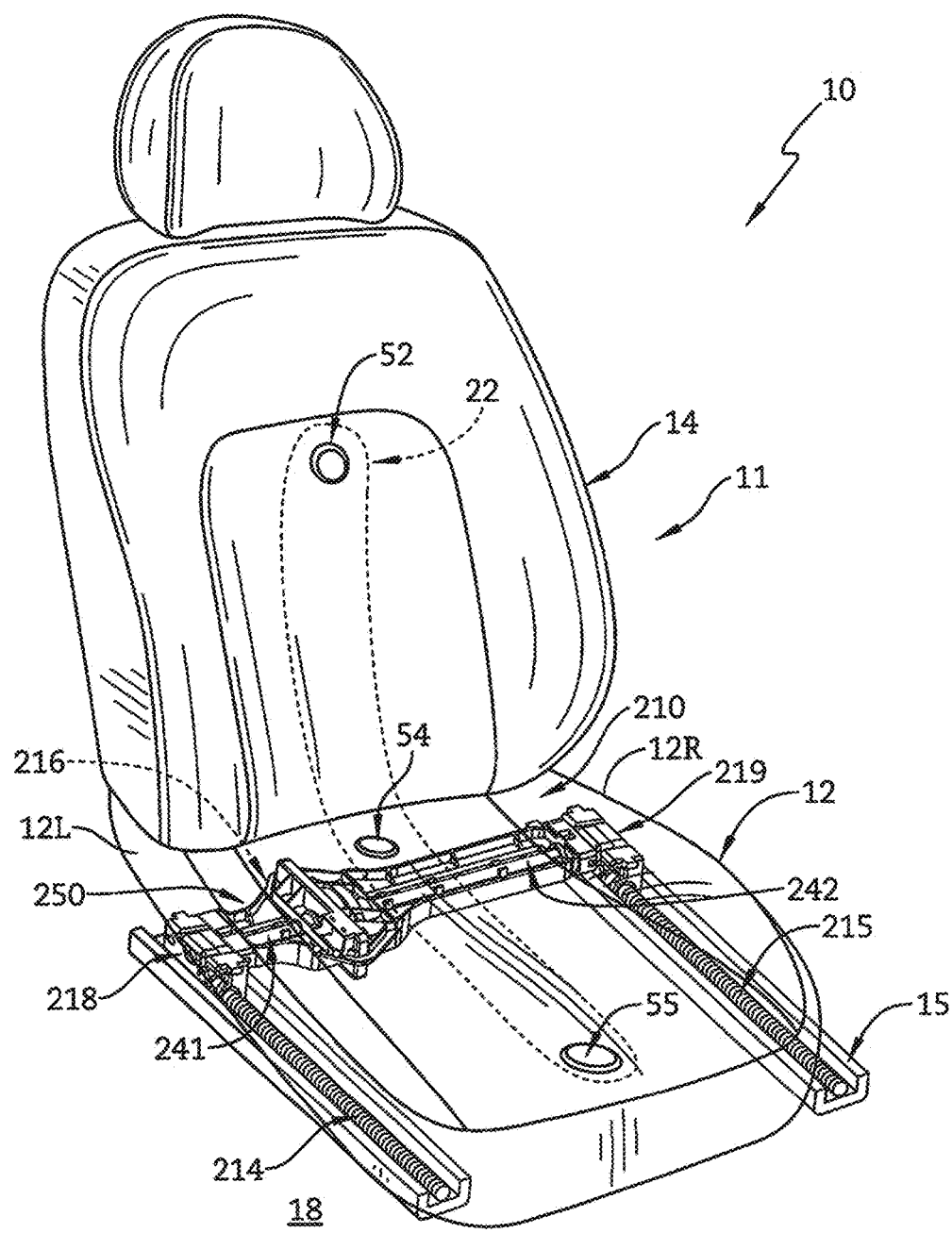
FIG. 10 is a perspective view of a second illustrative vehicle seat in accordance with the present disclosure showing that the slide mover extends across the seat bottom from a left to a right side of the seat bottom.
Figure 11:
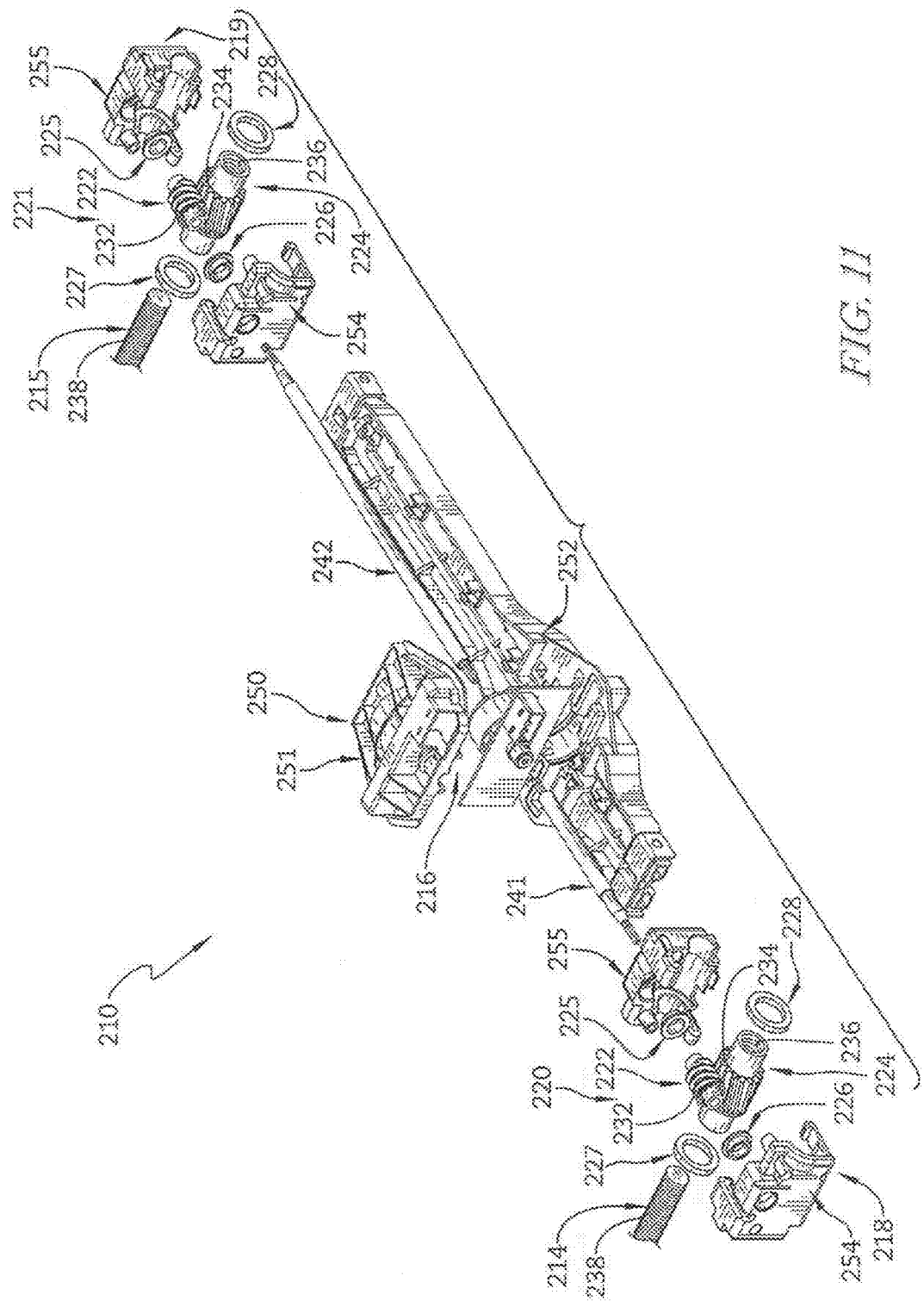
Figure 12:
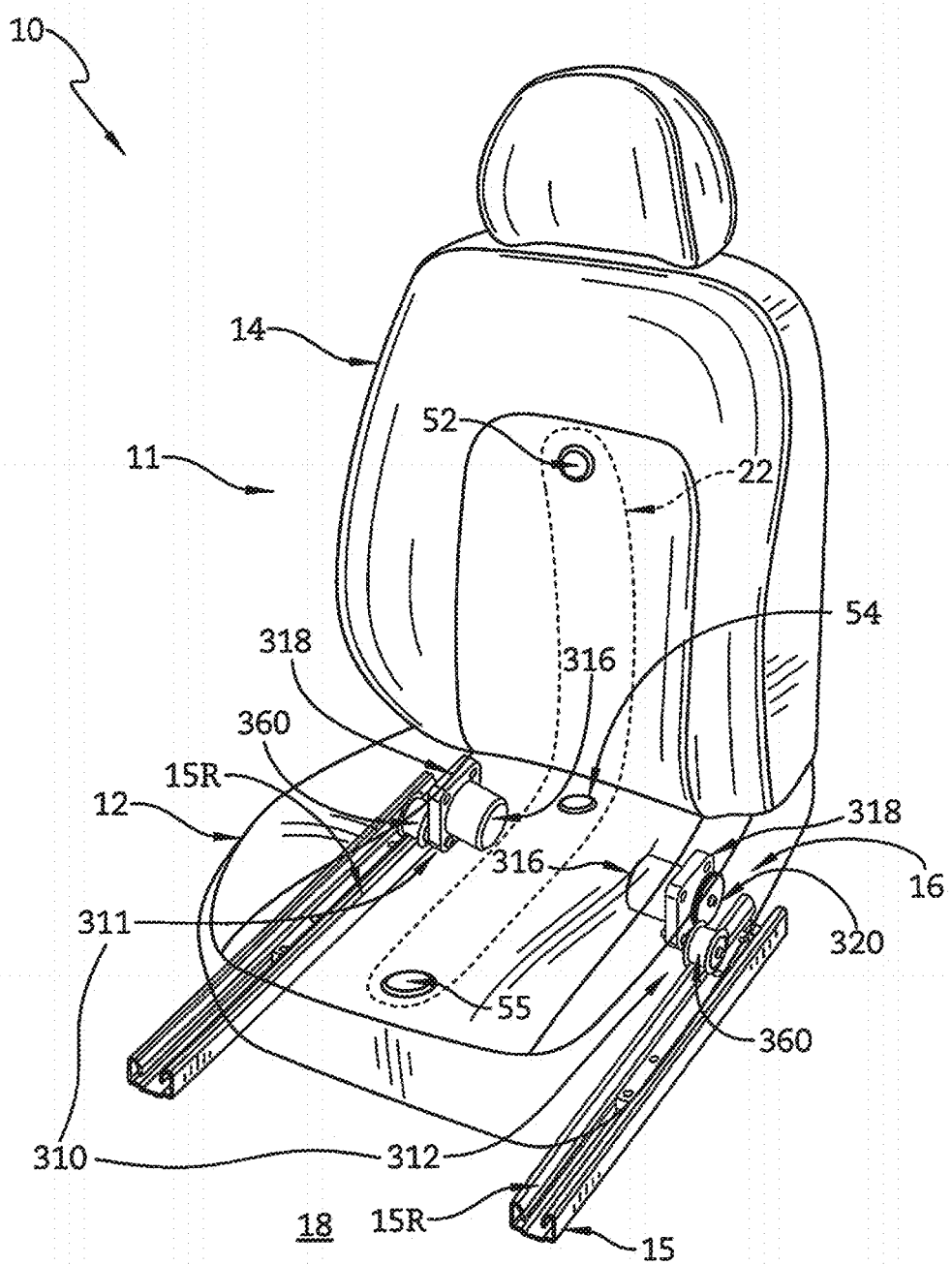
Figure 13:
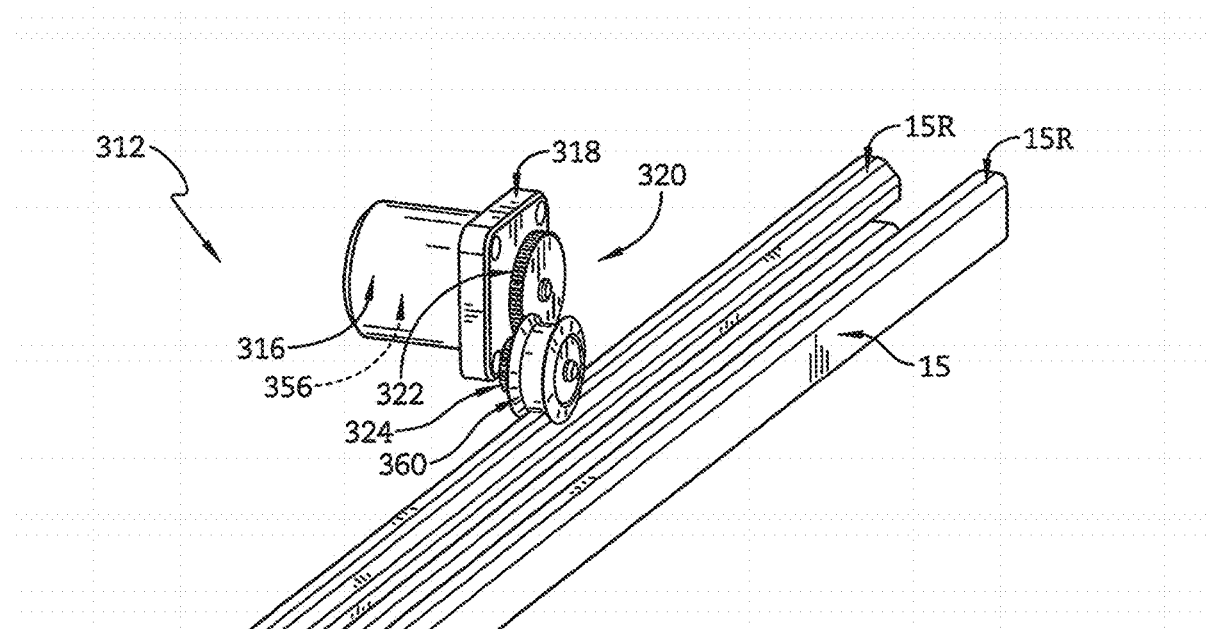
Figure 14:
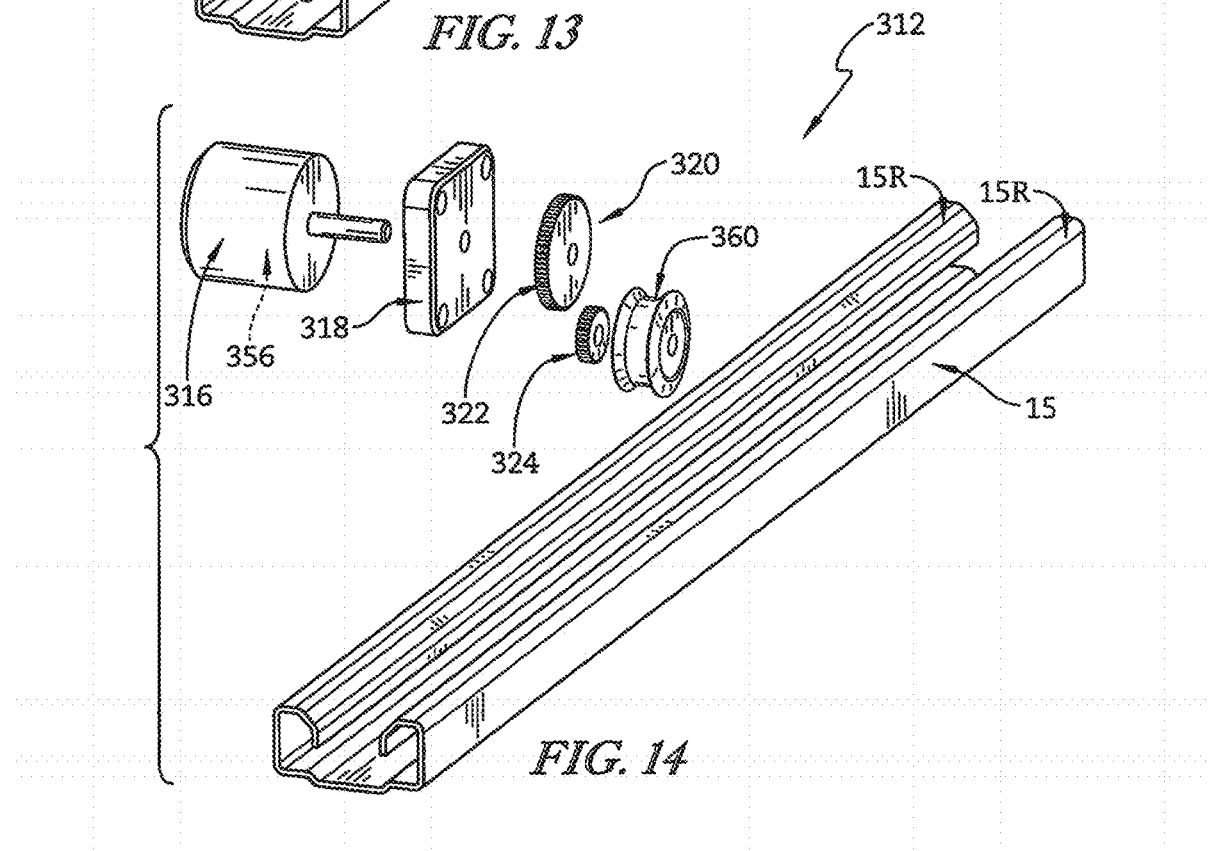
Figure 15:
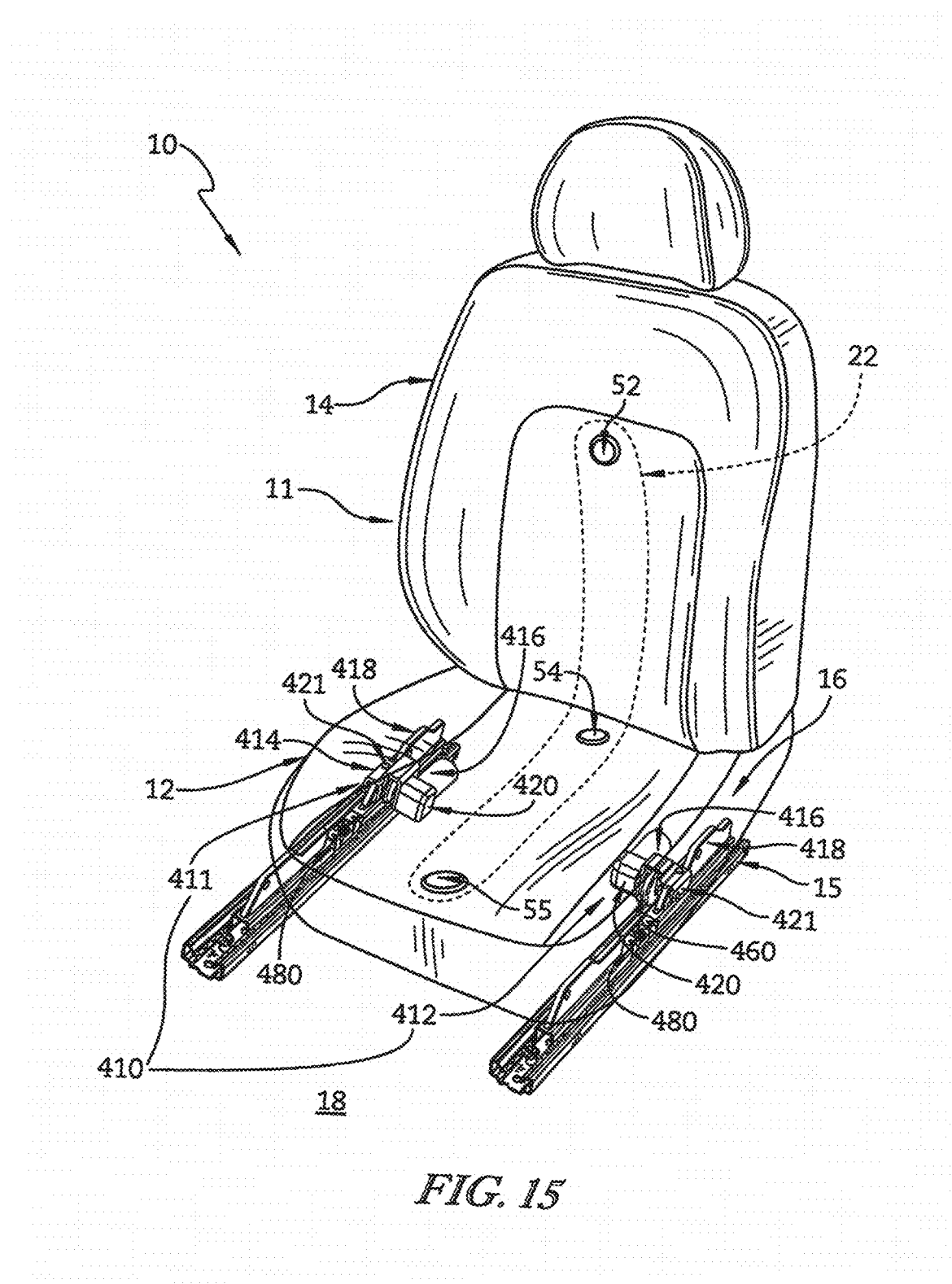
Figure 18:
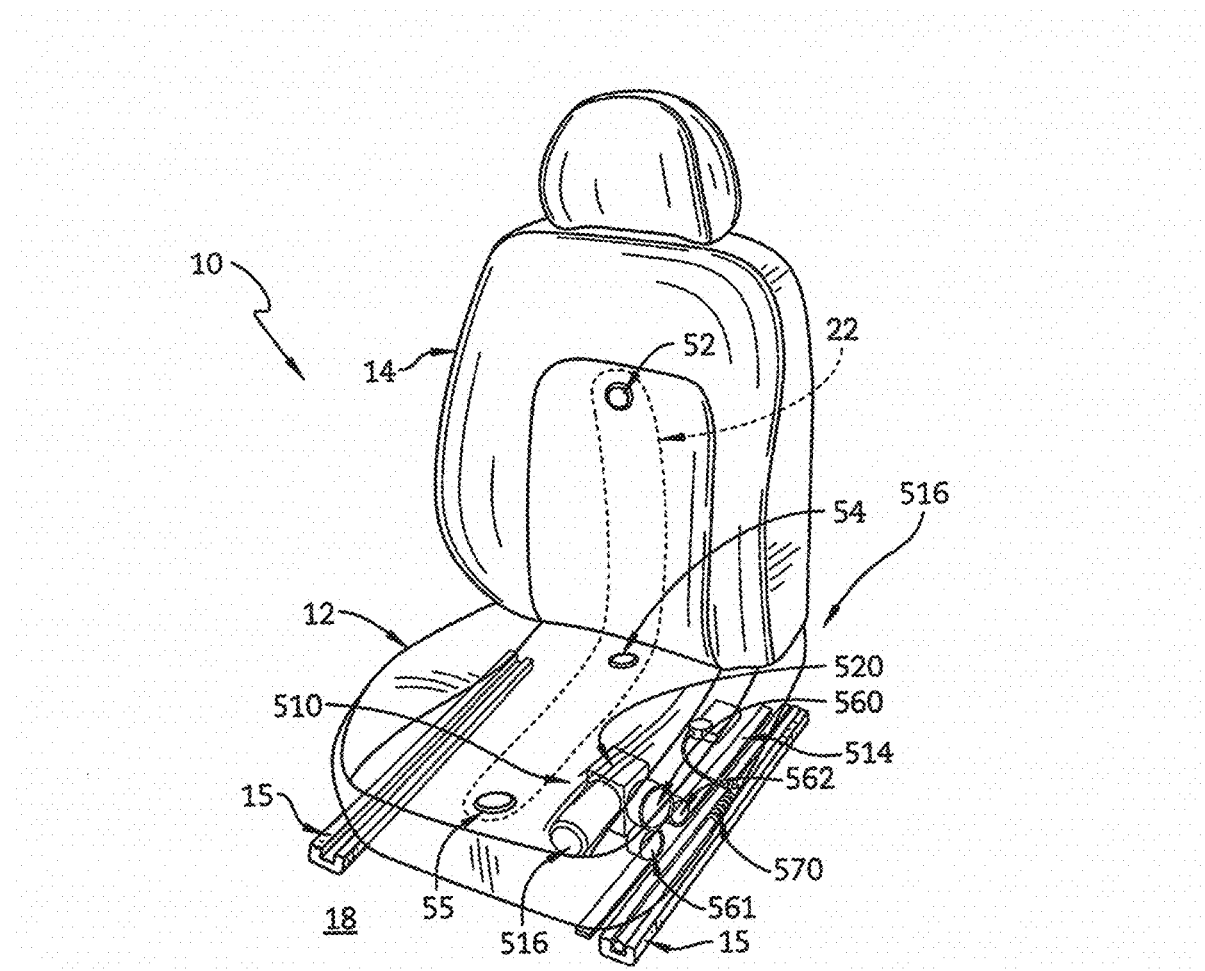
Figure 19:
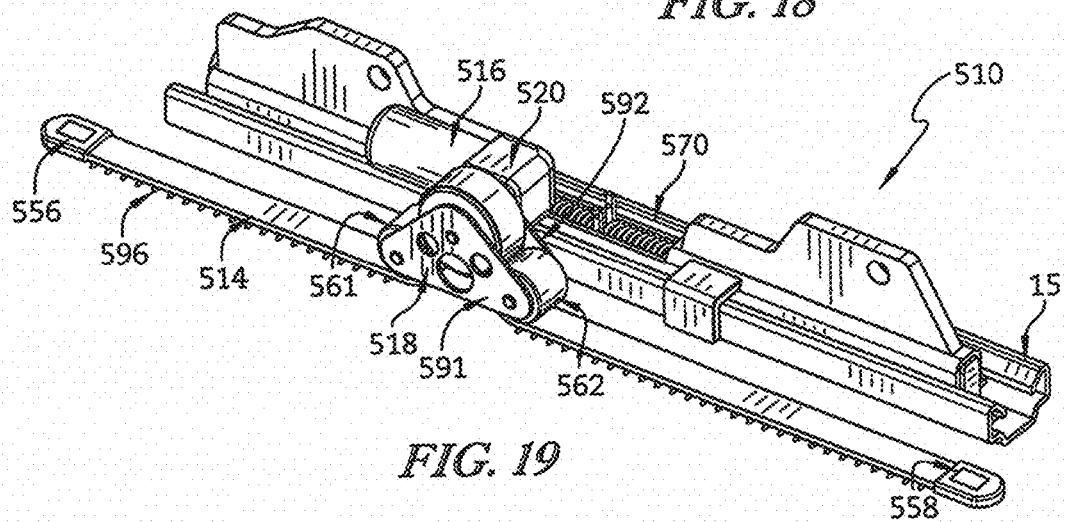
Figure 20:
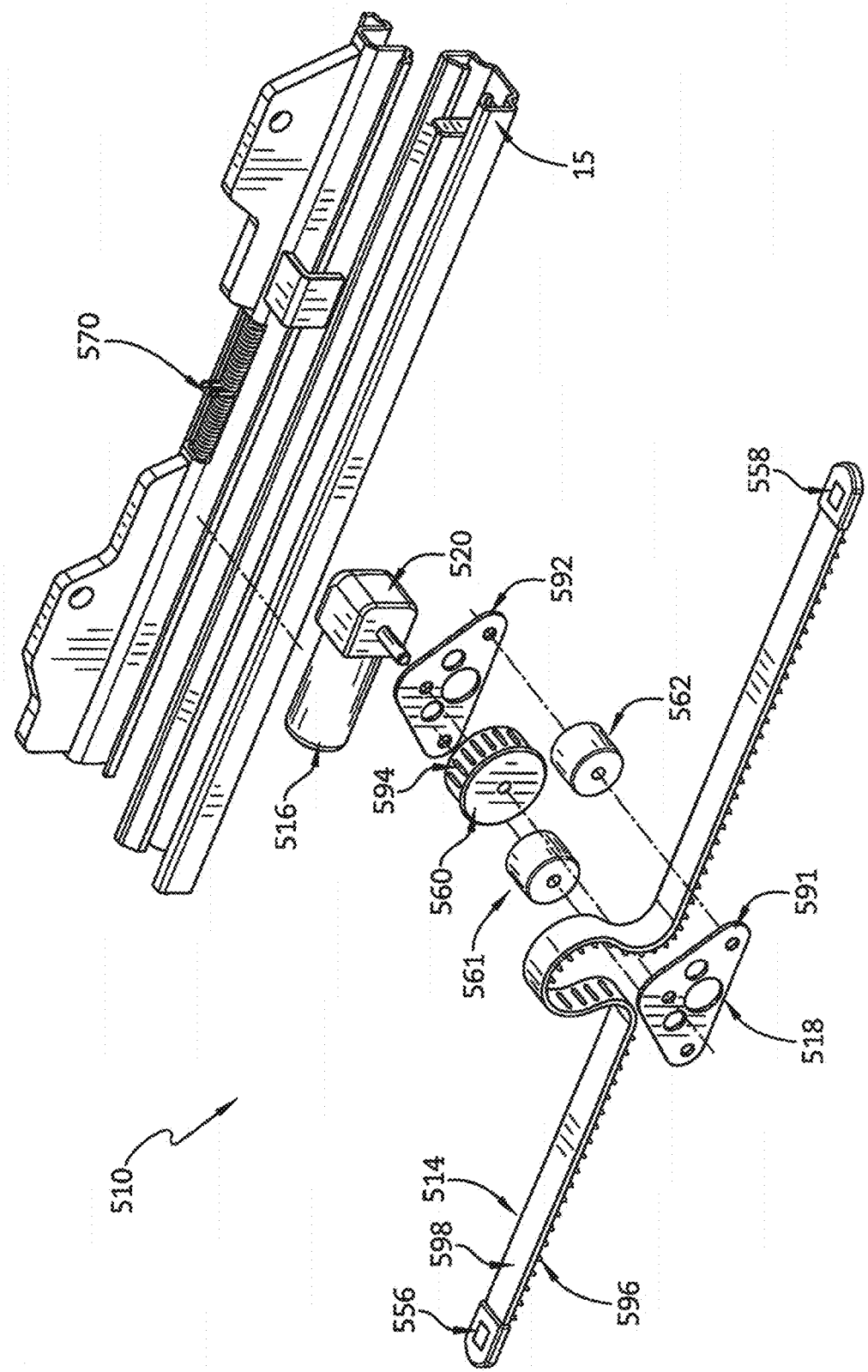
Figure 21:
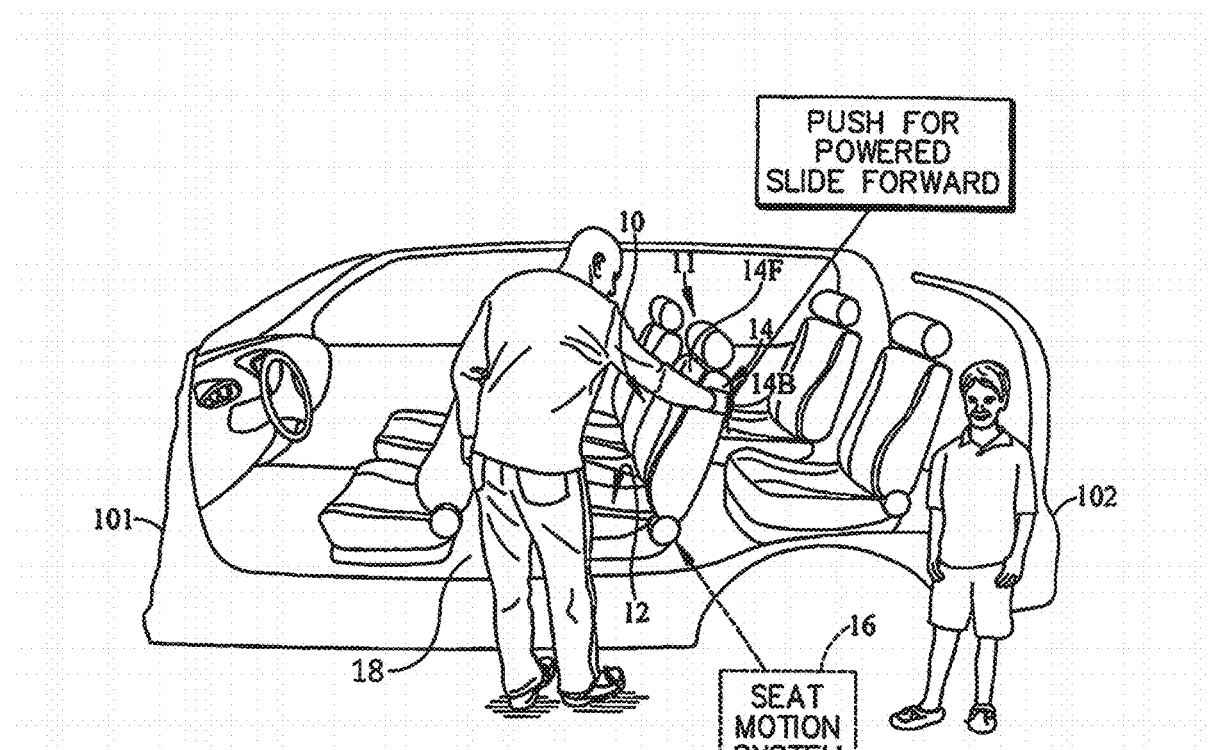
Figure 22:
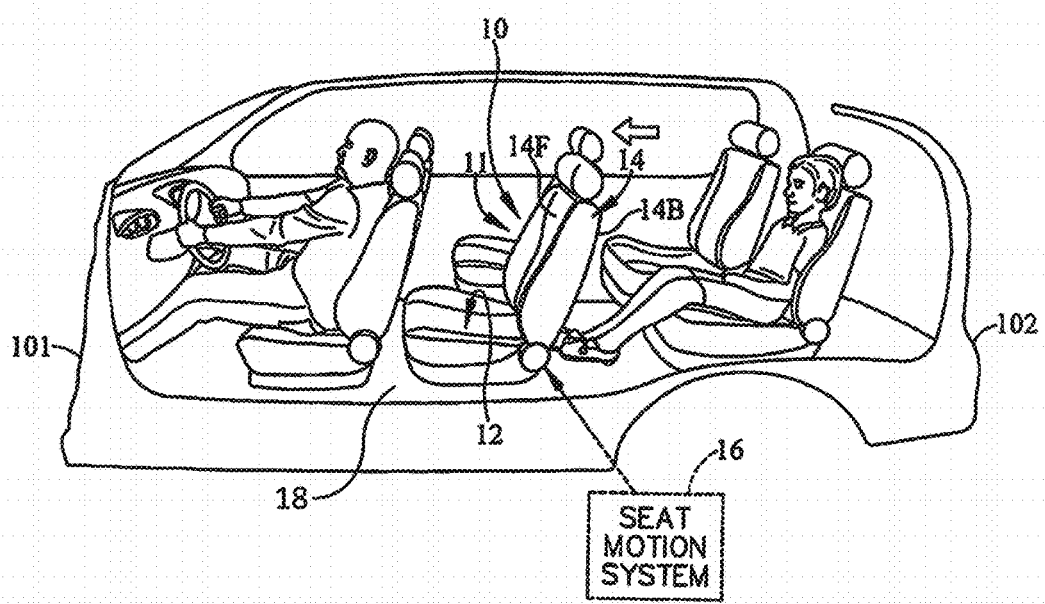
Figure 23:
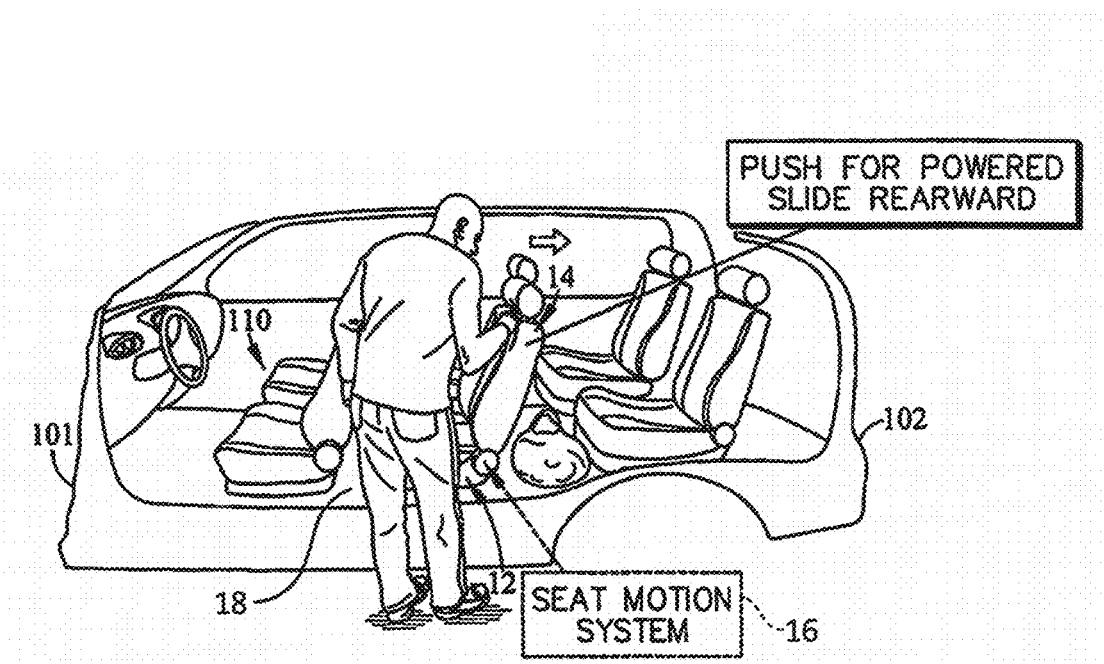
Figure 24:
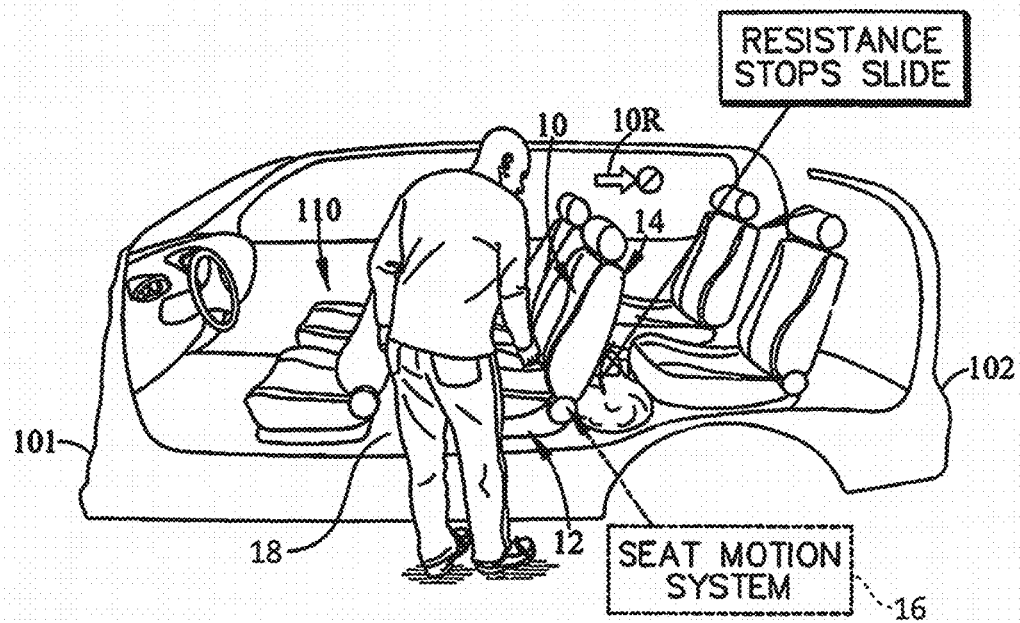
Figure 25:
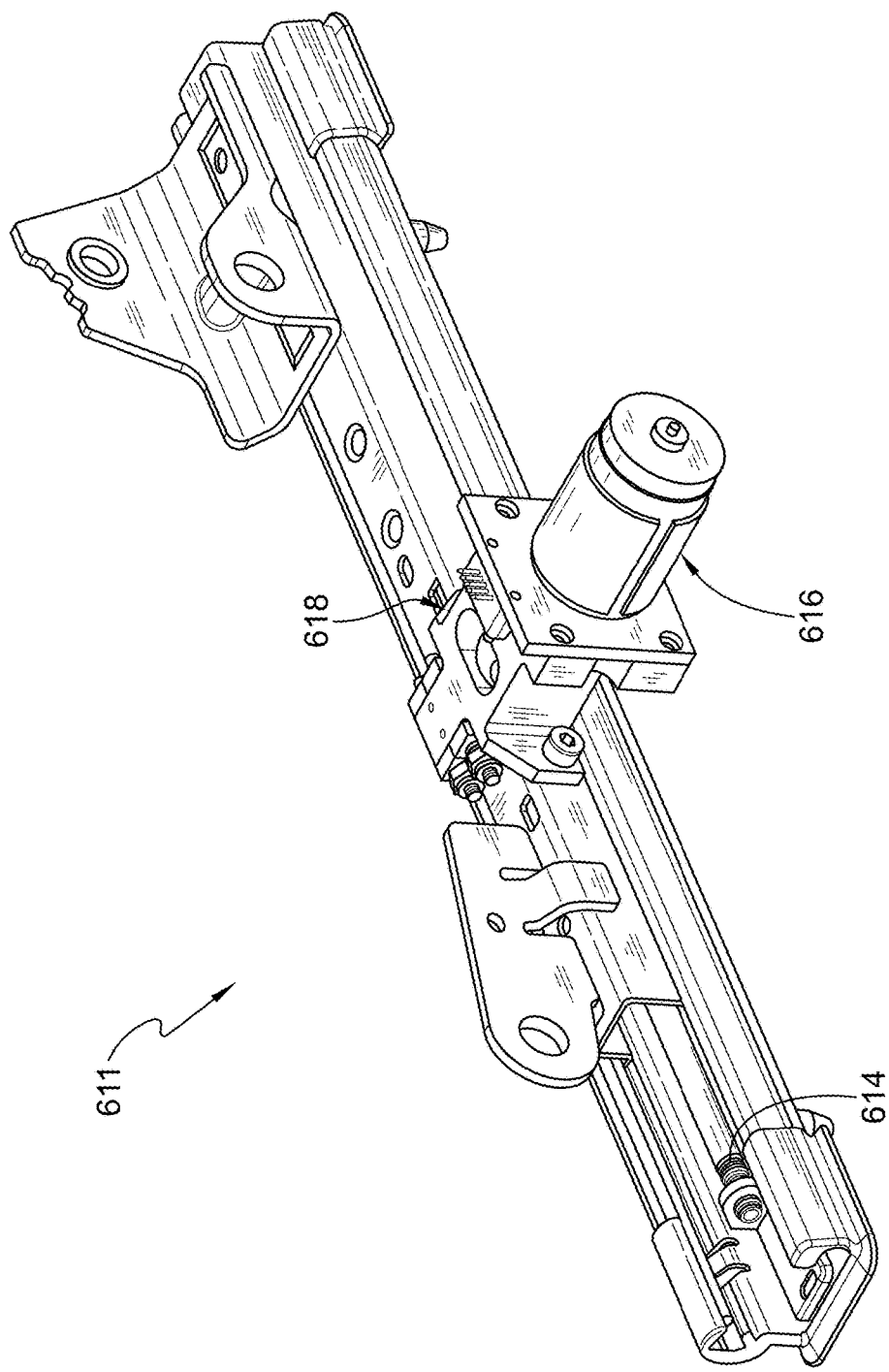
Figure 26:
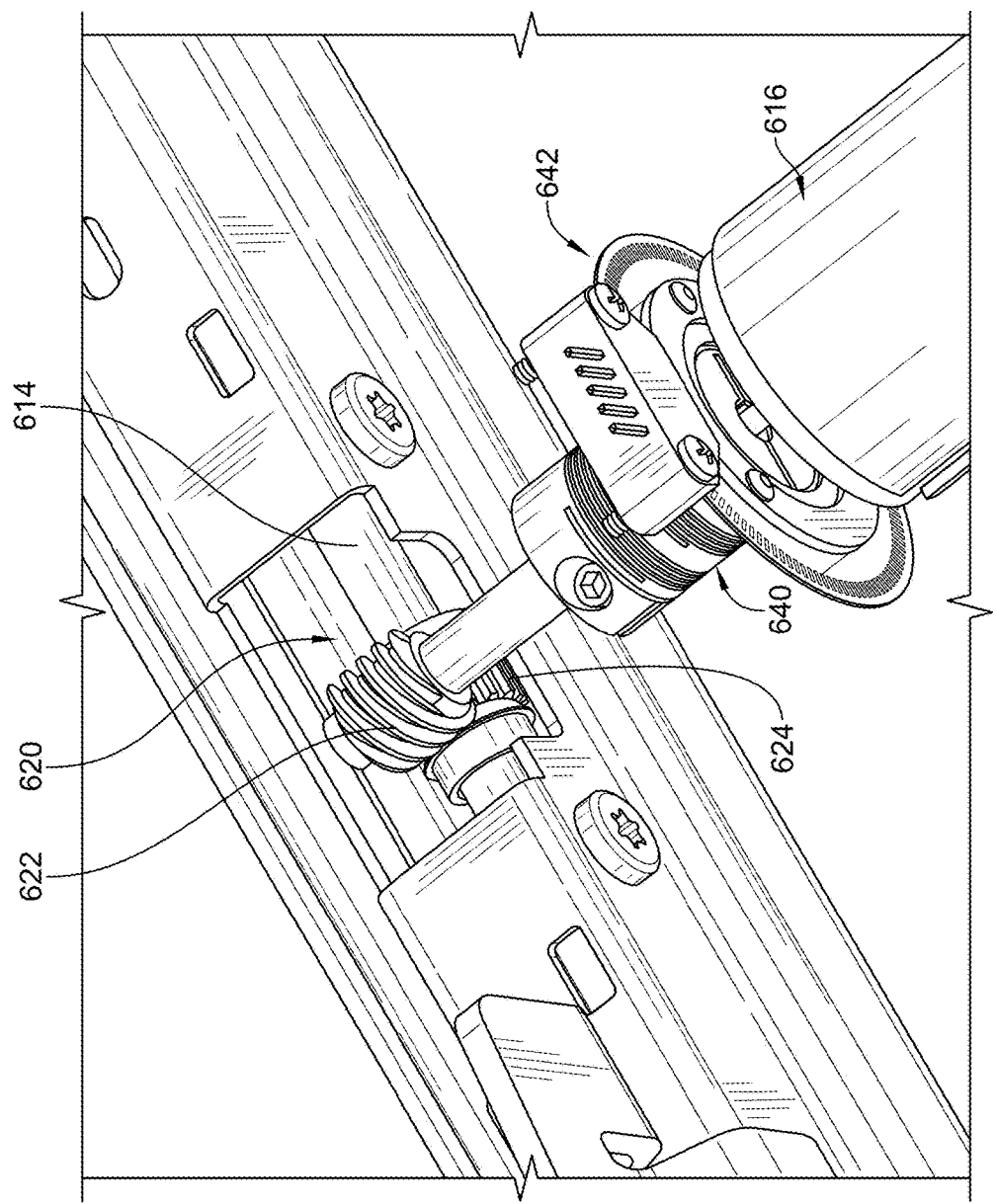
Figure 27:
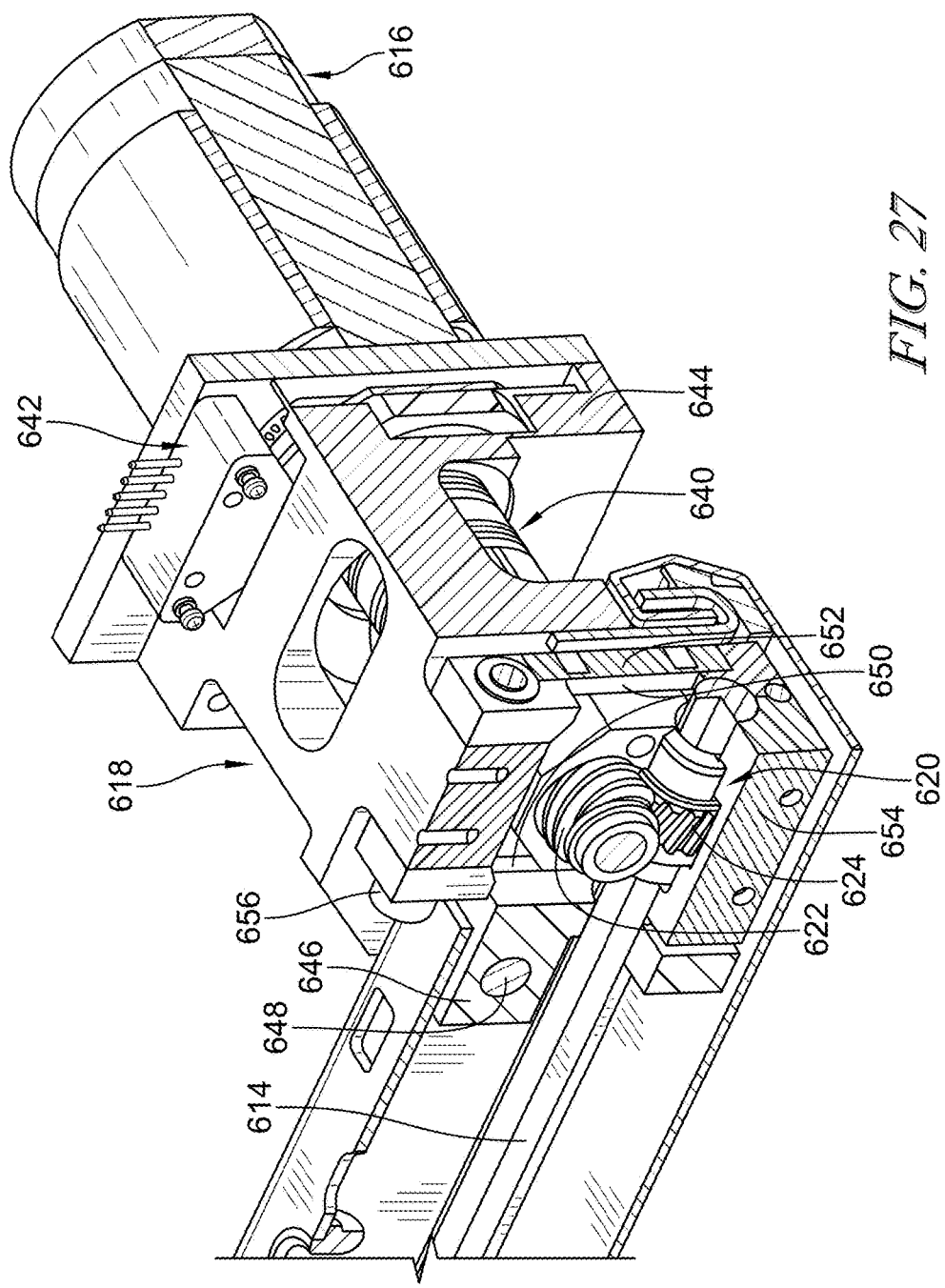
Figure 28:
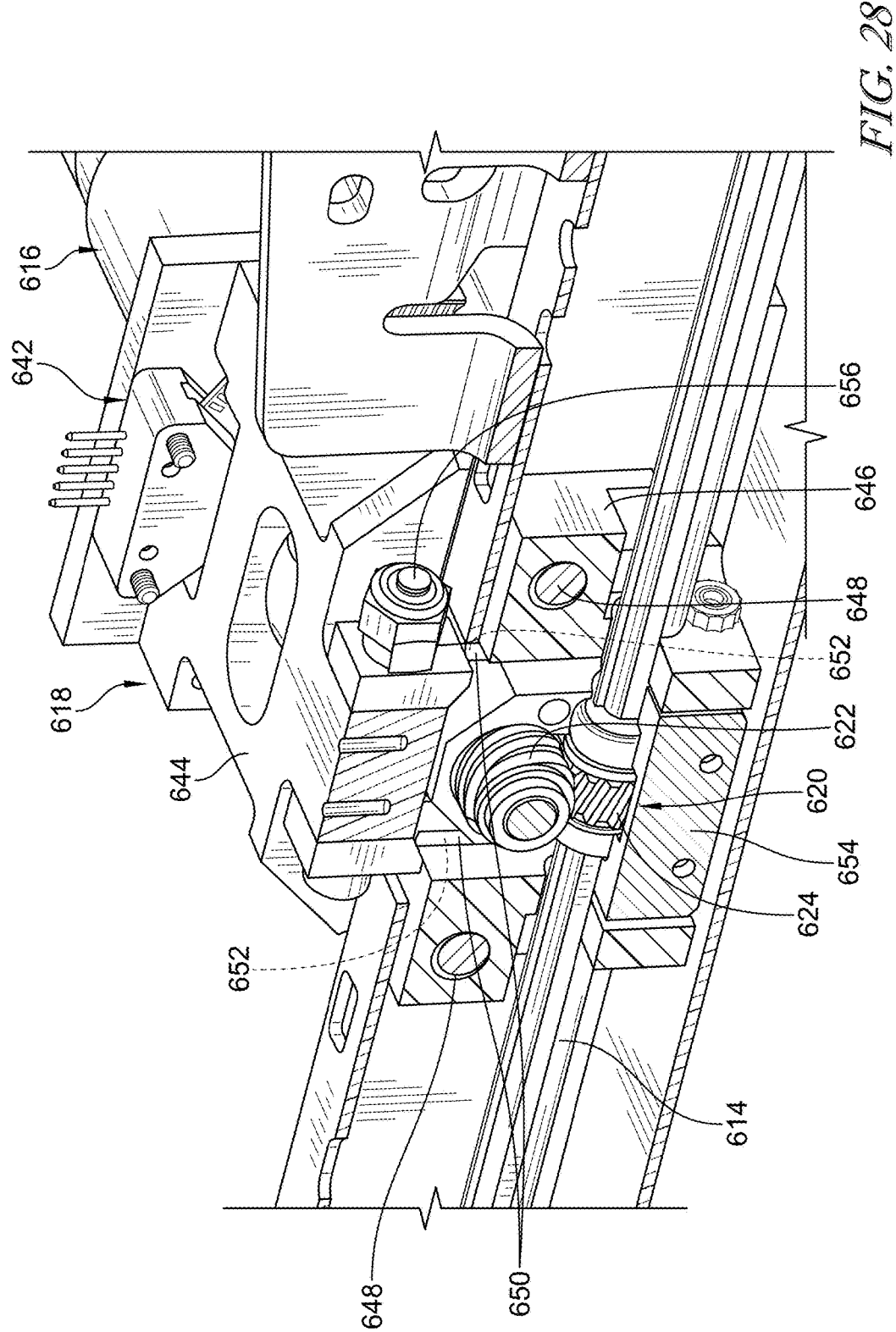
Figure 29:
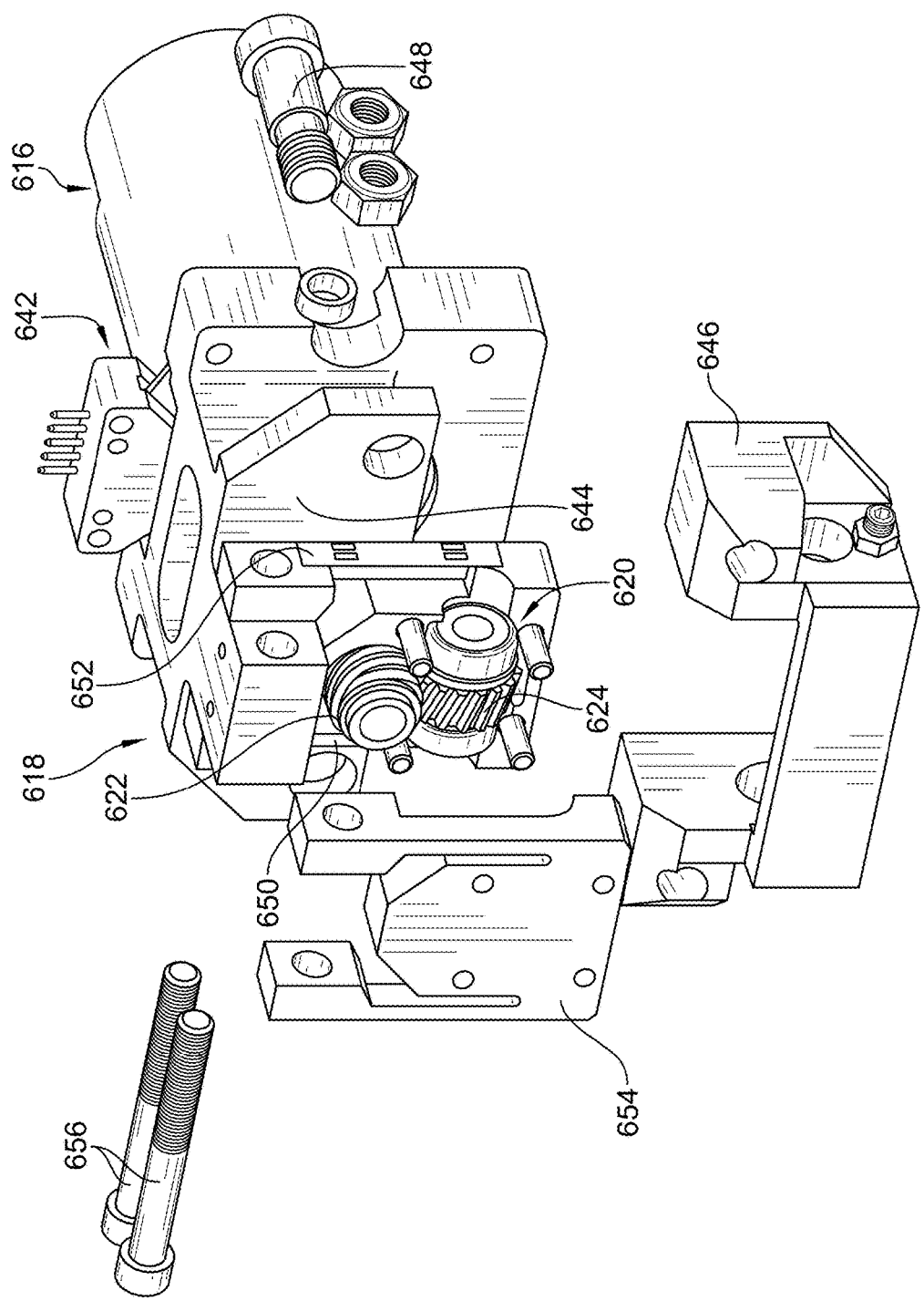
Figure 30:
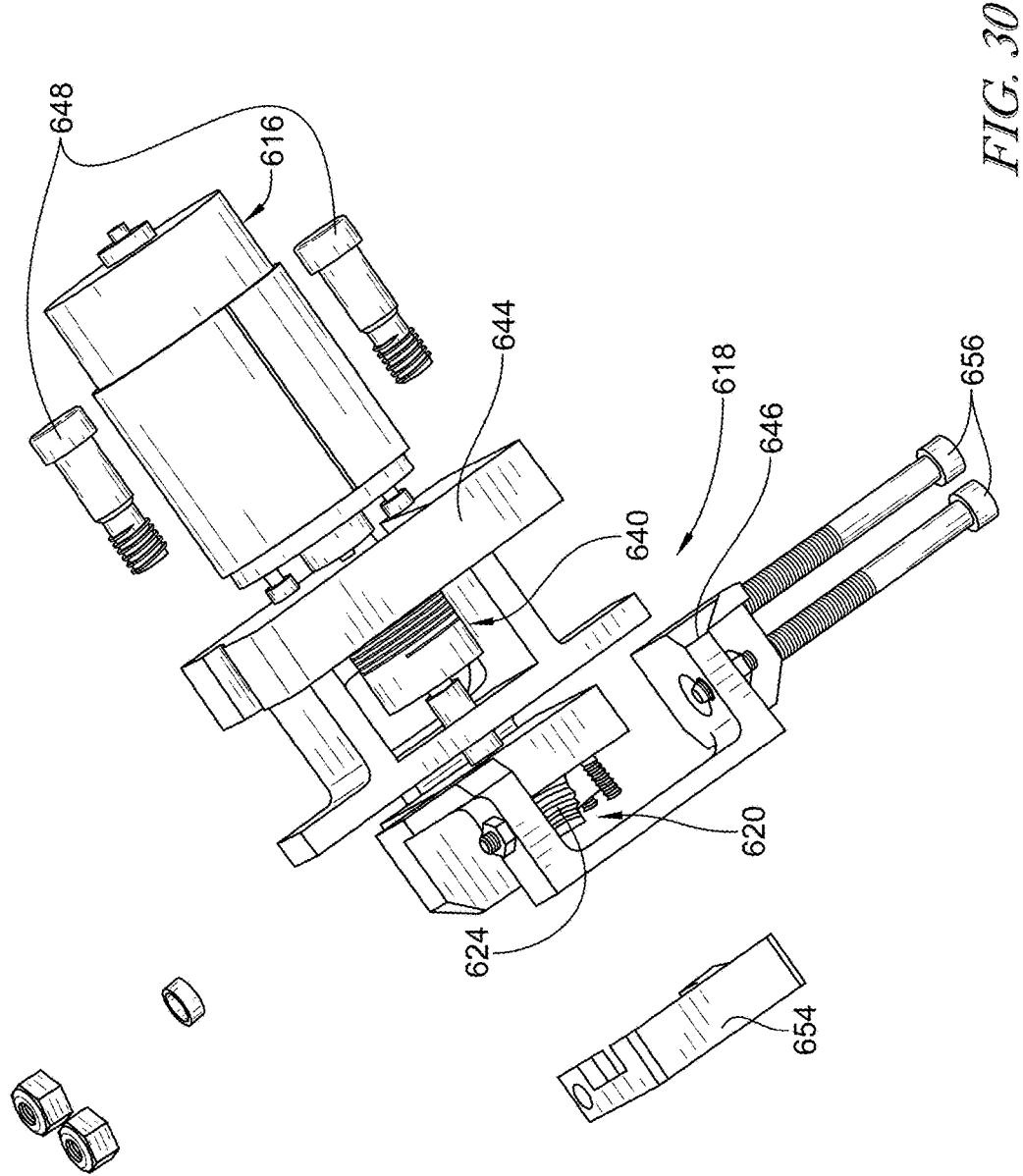
Figure 31:
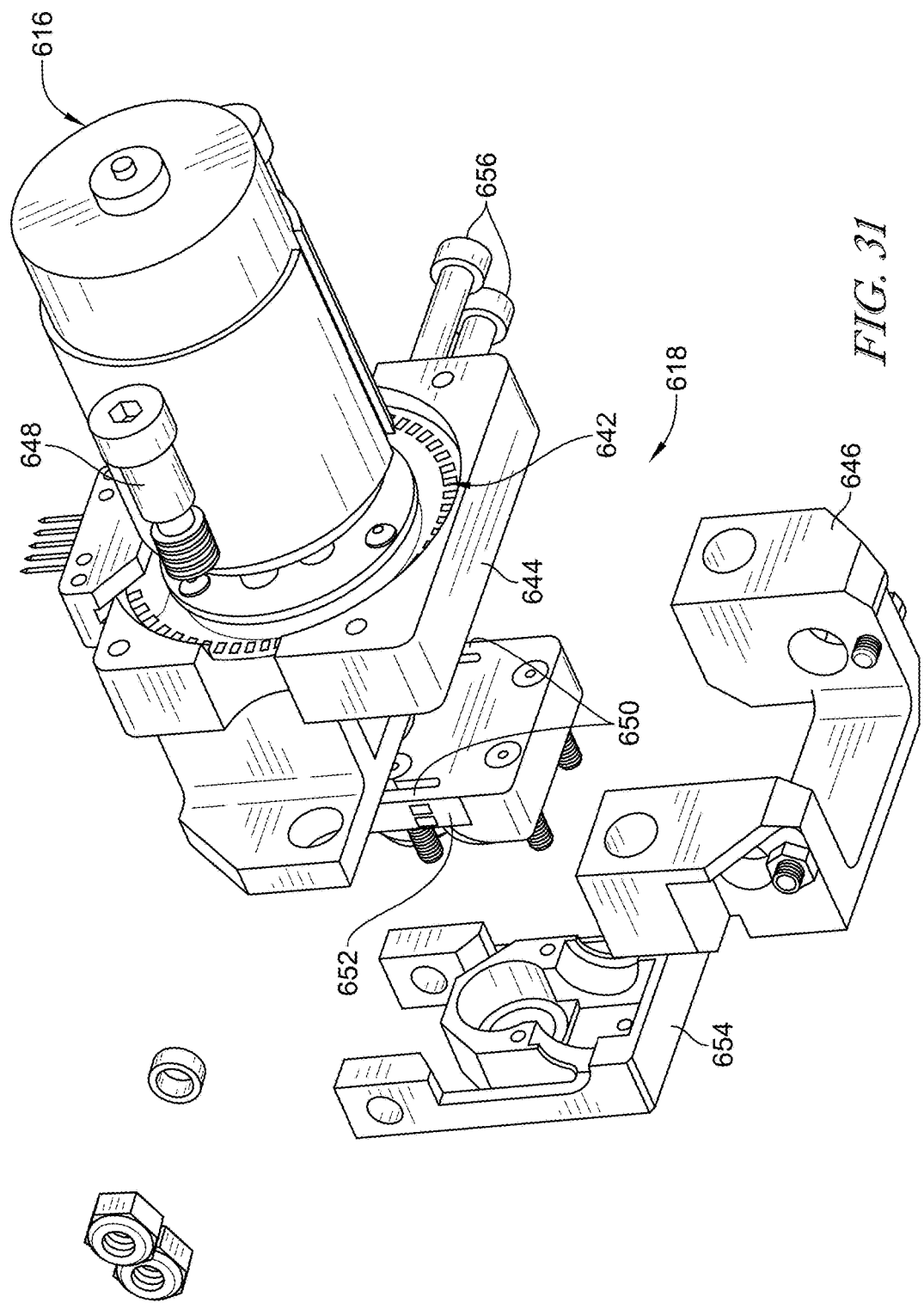
Figure 32:
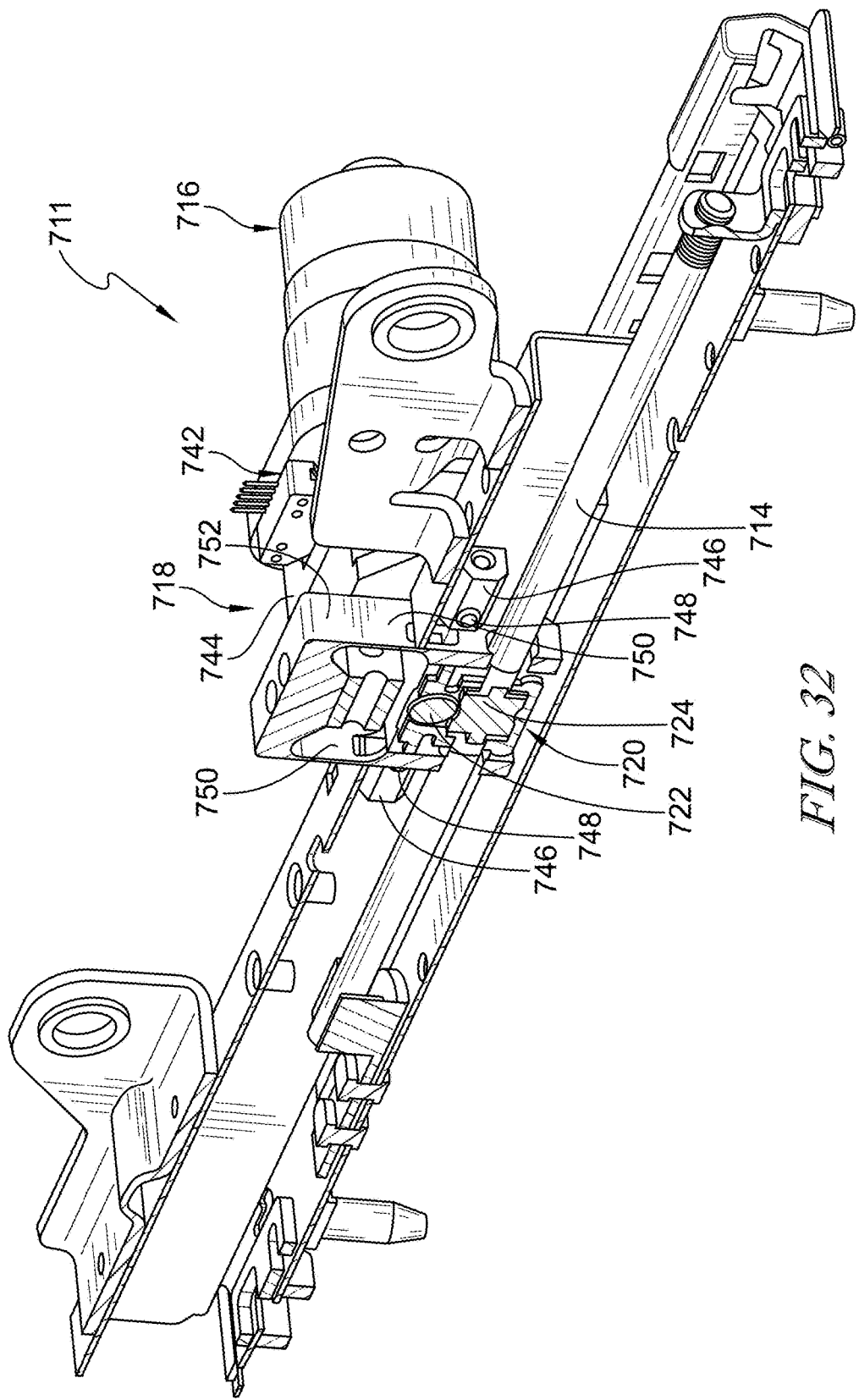
Figure 33:
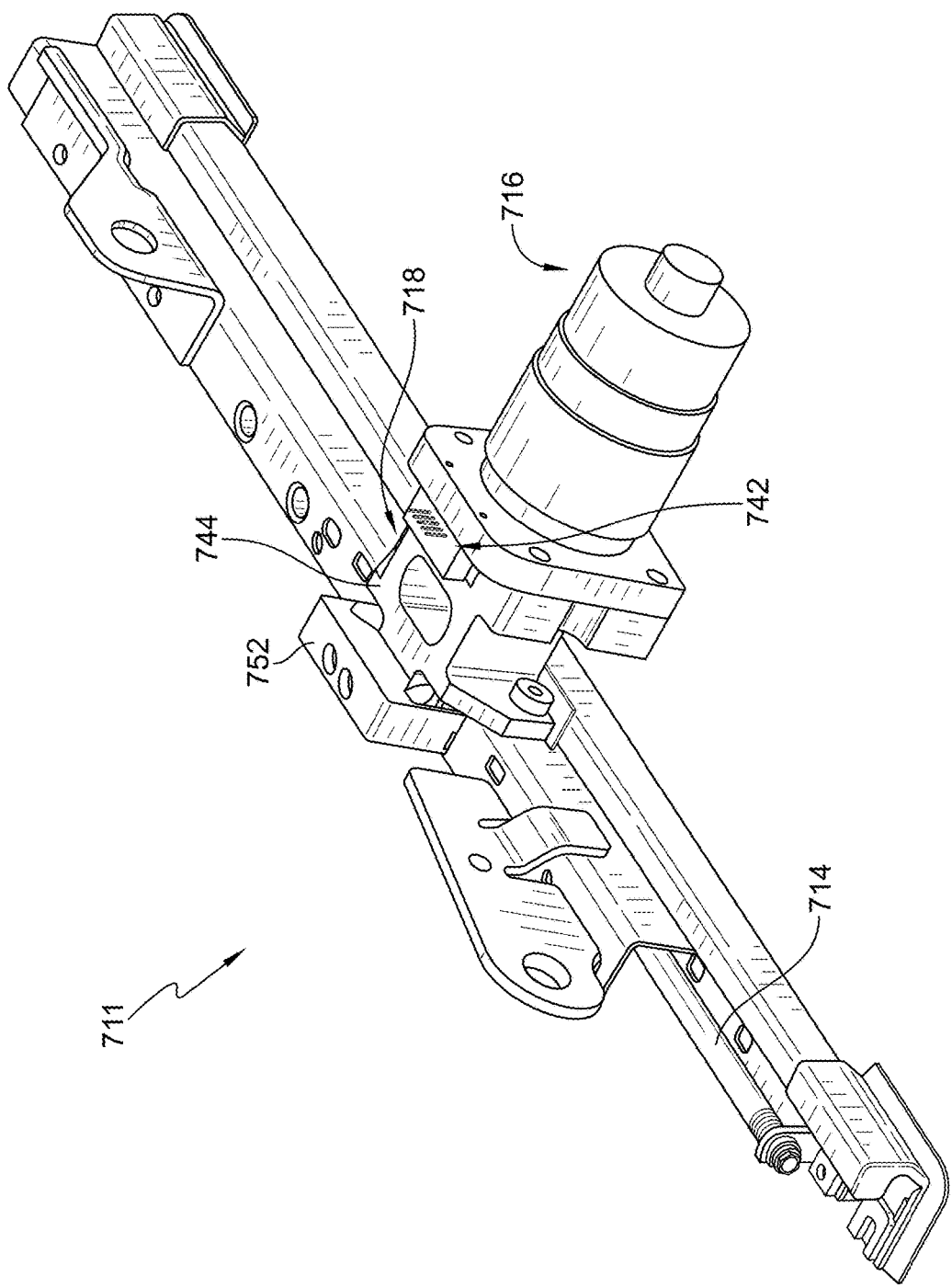
Figure 34:
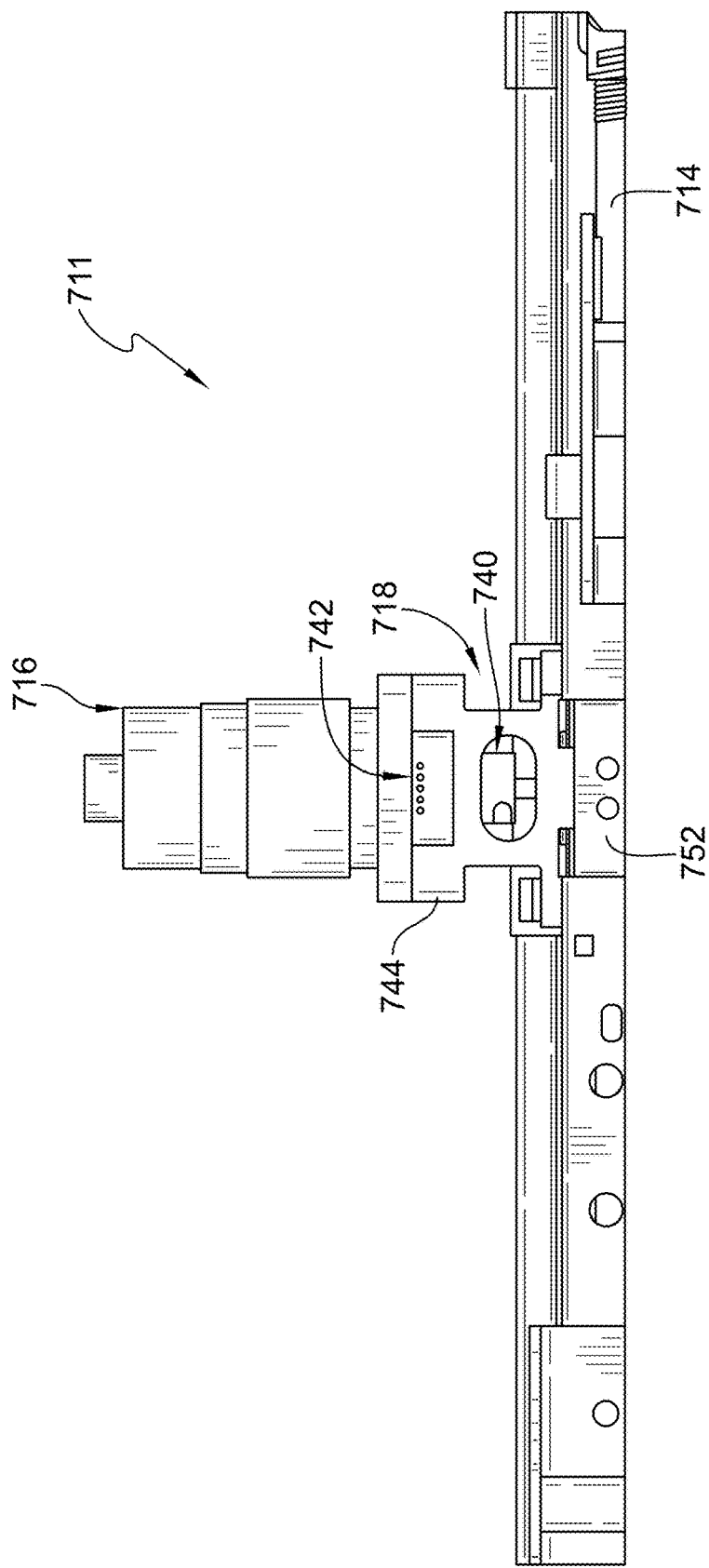

FIG. 11 is an exploded assembly perspective view of the slide mover of FIG. 10 showing that the slide mover includes threaded rods adapted to be coupled to the floor, brackets adapted to be coupled to the seat bottom that receive the threaded rods, a motor mounted between the brackets, flexible shafts that extend from the motor to brackets, and worm gear sets housed in brackets that are driven by the motor to move the seat bottom along the threaded rod;

FIG. 12 is a perspective view of a third illustrative vehicle seat in accordance with the present disclosure showing that the slide mover includes left and right side assemblies;

FIG. 13 is a detail perspective view of the right side assembly of the slide mover shown in FIG. 12 showing that the right side assembly includes a bracket adapted to be coupled to the seat bottom, a roller engaged with a rail included in the track underlying the seat bottom, and a motor coupled to the bracket and adapted to drive the roller;

FIG. 14 is an exploded assembly perspective view of the right side assembly of FIG. 13 showing that the right side assembly includes gear set coupled between the motor and the roller;

FIG. 15 is a perspective view of a fourth illustrative vehicle seat in accordance with the present disclosure showing that the slide mover includes left and right side assemblies;

FIG. 16 is a detail perspective view of the right side assembly of the slide mover shown in FIG. 15 showing that the right side assembly includes a bracket adapted to be coupled to the seat bottom, a roller engaged with a rail included in the track underlying the seat bottom, and a motor coupled to the bracket and adapted to drive the roller via a gearbox, FIG. 17 is an exploded assembly perspective view of the right side assembly of FIG. 16 showing that the right side assembly includes a slide lock coupled to the bracket and configured to block or allow movement of the seat bottom relative to a track;

FIG. 18 is a perspective view of a fifth illustrative vehicle seat in accordance with the present disclosure showing that the slide mover includes a flexible belt along which the seat bottom is moved;

FIG. 19 is a detail perspective view of the slide mover shown in FIG. 18 showing that the slide mover includes the flexible belt adapted to be coupled to the floor, a bracket coupled to the seat bottom, a motor coupled to the bracket, guide rollers for coupling the flexible belt to the bracket, and a drive roller engaged with the flexible belt and coupled to the motor to be driven by the motor, FIG. 20 is an exploded assembly perspective view of the right side assembly of FIG. 19 showing that the slide mover includes a slide lock coupled to the bracket and configured to block or allow movement of the seat bottom relative to the rail;

FIGS. 21 and 22 are side perspective views of a passenger vehicle with vehicle seats mounted to a floor showing that an illustrative vehicle seat is moved forward along the floor away from another vehicle seats in response to a user applying a force onto the back side of a seat back so that the vehicle seat is rearranged within the passenger vehicle to allow a passenger to enter and occupy a vehicle seat behind the moved vehicle seat;

FIG. 21 is a side perspective view of a passenger vehicle showing that the seat motion system is configured to slide a vehicle seat along the floor in response to a user applying a force onto a back side of the seat back so that the vehicle seat is rearranged within the passenger vehicle to allow a passenger to enter and occupy another vehicle seat as shown in FIG. 18;

FIG. 22 is a view similar to FIG. 21 showing the vehicle seat moved along the floor after a user applied a force onto the back side of the seat back of the vehicle seat so that the vehicle seat is rearranged to allow a passenger to enter and occupy the seat behind the vehicle seat;

FIGS. 23 and 24 are side perspective views of the passenger vehicle shown in FIGS. 21 and 22 showing that the vehicle seat is moved backward along the floor in response to a user applying a force onto the front side of the seat back included in the vehicle seat so that the cargo is secured between vehicle seats;

FIG. 23 is a view similar to FIG. 21 showing that the seat motion system is configured to slide the vehicle seat backward along the floor in response to a user applying a force onto the front side of the seat back so that the second-row vehicle seat is rearranged within the passenger vehicle to secure cargo between vehicle seats as shown in FIG. 24;

FIG. 24 is a view similar to FIG. 23 showing the vehicle seat moved backward along the floor after a user applied a force onto the front side of the seat back included in the vehicle seat so that cargo between is secured between vehicle seats;

FIG. 25 is a perspective view of another embodiment of a left side unit in accordance with the present disclosure showing that the left side unit includes a threaded rod adapted to be coupled to a floor and a motor adapted to be coupled to the seat bottom via a bracket to cause the vehicle seat to move back and forth relative to the floor and threaded rod in response to forces applied to the vehicle seat as suggested in FIG. 1;

FIG. 26 is an enlarged partial perspective view of left side unit of FIG. 25 with portions broken way to reveal that the left side unit includes a worm gear coupled to the motor, a worm wheel coupled to the threaded rod, a flex coupling coupled to the motor between the motor and the worm gear, and an encoder coupled to the motor to provide motor-position feedback to a controller included in the seat motion system;

FIG. 27 is an enlarged partial perspective view of the left side unit of FIG. 26 with portions broken away to reveal that the left side unit further includes a bracket including a mounting plate arranged to support the motor and the encoder and a backing plate spaced apart from the mounting plate, and a bolt arranged to extend between and interconnect the mounting plate and backing plate, a pair of flexures coupled to the mounting plate, and a pair of associated load cells coupled to the flexures and configured to sense longitudinal load applied to the vehicle seat and communicate the sensed load to the controller as suggested in FIG. 2;

FIG. 28 in an enlarged partial perspective view of the left side unit of FIG. 27 with portions broken away to reveal that the flexures and associated load cells are arranged to sense longitudinal loads (pushing or pulling) applied to the vehicle seat and communicate those sensed loads to the controller to cause the controller to communicate to the motor how fast to move the vehicle seat;

FIG. 29 is a partial exploded perspective view of the left side unit of FIGS. 25-28 showing that the left side unit includes the motor, the encoder, the bracket including the mounting plate, the backing plate, and a retention plate, the pair of flexures, the pair of load cells, worm gear, and the worm wheel;

FIG. 30 is a partial exploded perspective view of the left side unit of FIG. 29 taken from a bottom of the left side unit and showing the flex coupling interconnecting the worm gear and the motor;

FIG. 31 is a view similar to FIG. 30 taken from a lower-rear perspective showing portions of the encoder coupled to the motor;

FIG. 32 is a front perspective view of another embodiment of a left side unit in accordance with the present disclosure with portions broken away showing that the left side unit includes a threaded rod adapted to be coupled to a floor and a motor adapted to be coupled to the seat bottom via a bracket to cause the vehicle seat to move back and forth relative to the floor and threaded rod in response to forces applied to the vehicle seat as suggested in FIG. 1;

FIG. 33 is a rear perspective view of the left side unit of FIG. 32;

FIG. 34 is a plan view of the left side unit of FIGS. 32 and 33; and

Figure 35:
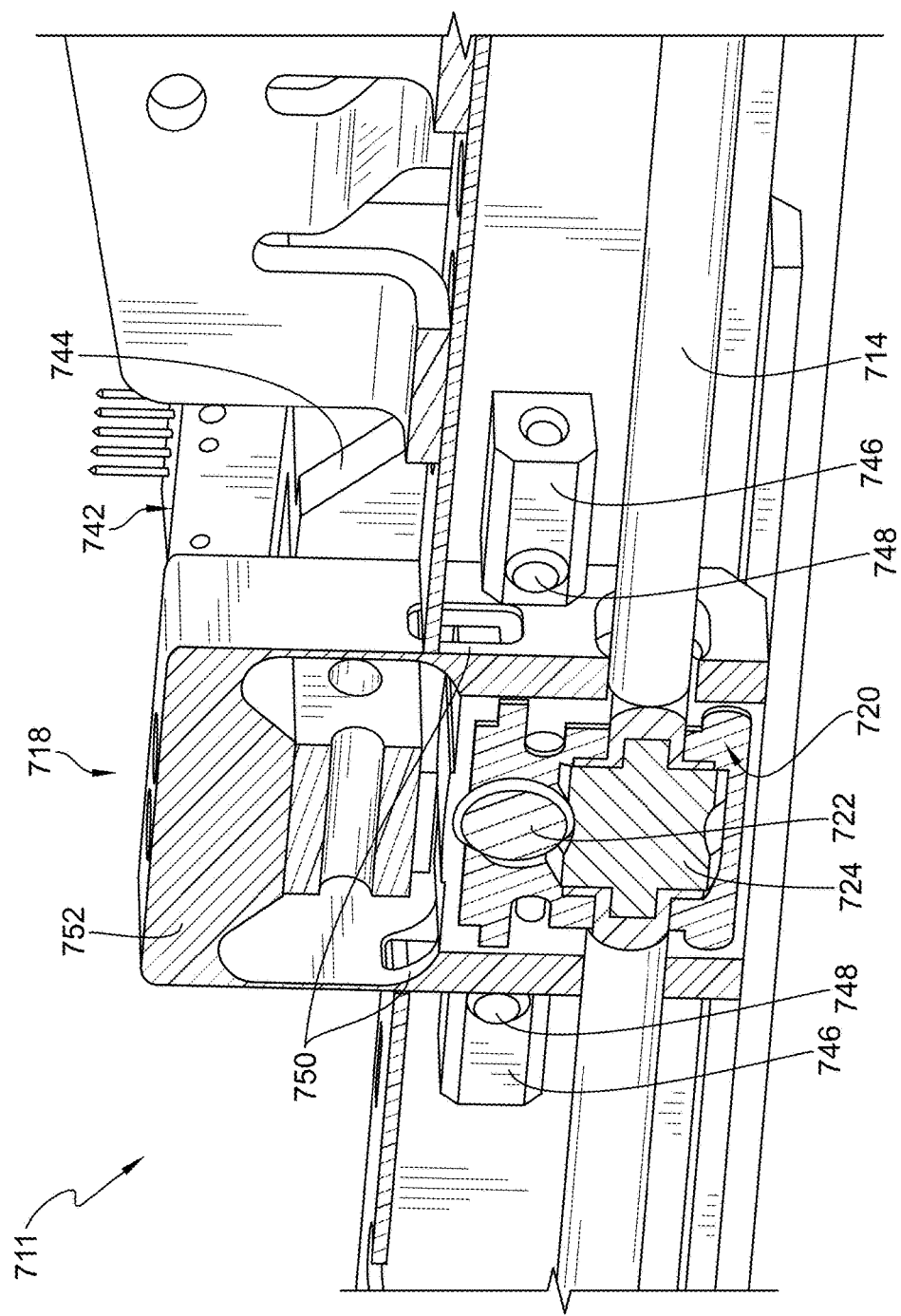

FIG. 35 is an enlarged partial perspective view of the left side unit of FIG. 32 showing that the left side unit includes a threaded rod adapted to be coupled to a floor, a worm gear coupled to a motor, a worm wheel coupled to the threaded rod a bracket including a mounting plate arranged to support the motor and an encoder, a backing plate spaced apart from the mounting plate, and a carrier plate coupled to the mounting plate, a pair of flexures coupled to the carrier plate, and adapted to support a pair of load cells.

DETAILED DESCRIPTION

A passenger vehicle 100 includes an illustrative vehicle seat 10 mounted to a floor 18 as shown in FIG. 1. The vehicle seat 10 includes a powered slide mover 110 adapted to move a passenger support portion 11 of the vehicle seat 10 along the floor 18 in response to a user gently pushing or pulling on the passenger support portion 11 of the vehicle seat 10. Accordingly, the passenger support 11 of the vehicle seat 10 glides along the floor 18 without requiring the user to manipulate input buttons, switches, and levers associated with movement along the floor 18 and without having to manually overcome forces resisting movement of the vehicle seat 10 as suggested in FIGS. 1 and 21-24.

The vehicle seat 10 illustratively includes a seat bottom 12, a seat back 14, and a seat motion system 16 as shown, for example, in FIG. 1. The seat bottom 12 and seat back 14 cooperate to provide the passenger support 11 that is coupled to a track 15 mounted on the floor 18 so that the passenger support 11 can slide along the floor 18. The seat back 14 extends upwardly from the seat bottom 12. The seat motion system 16 is coupled to the seat bottom 12 and the seat back 14 to provide powered means for sliding the seat bottom 12 along the floor 18 in response to a user input applied to the seat bottom 12 or the seat back 14 of the vehicle seat 10 as suggested in FIGS. 1 and 21-24.

The seat motion system 16 includes a slide mover 110, a power source 20, a sensor unit 22, and a controller 24 coupled to each of the other components of the seat motion system 16 as shown in FIGS. 1 and 2. The slide mover 110 is configured to move the passenger support 11 along the floor 18. The power source 20 is selectively coupled to the slide mover 110 by the controller 24 to slide the seat bottom forward or backward along the track 15. The sensor unit 22 detects forces applied to the seat bottom 12 and to front or back sides 14F, 14B of the seat back 14. The controller 24 receives the signals from the sensor unit 22 and is configured to activate the slide mover 110 in response as suggested in FIG. 21. Thus, the seat motion system 16 provides means for rearranging the vehicle seat 10 by moving the passenger support 11 in response to a user applying a force onto the passenger support 11 so that the vehicle seat 10 glides along the floor 18 when gently pushed or pulled by a user without requiring the user to manually overcome all frictional and gravitational forces resisting movement of the vehicle seat 10.

In the illustrative embodiment, the seat motion system 16 also includes an enablement unit 60 and, optionally, may include a track position sensor 62 as shown in FIGS. 1 and 2. The enablement unit 60 is illustratively embodied as an enablement button 61 incorporated into a dash display 64 that may be pressed to indicate to the controller 24 that additional force applied to the vehicle seat 10 is intended to cause movement of the passenger support 11 along the floor 18. The optional track position sensor 62 may be used in some embodiments as an input for adjusting the speed at which the passenger support 11 is moved along the floor 18.

Figure 3:
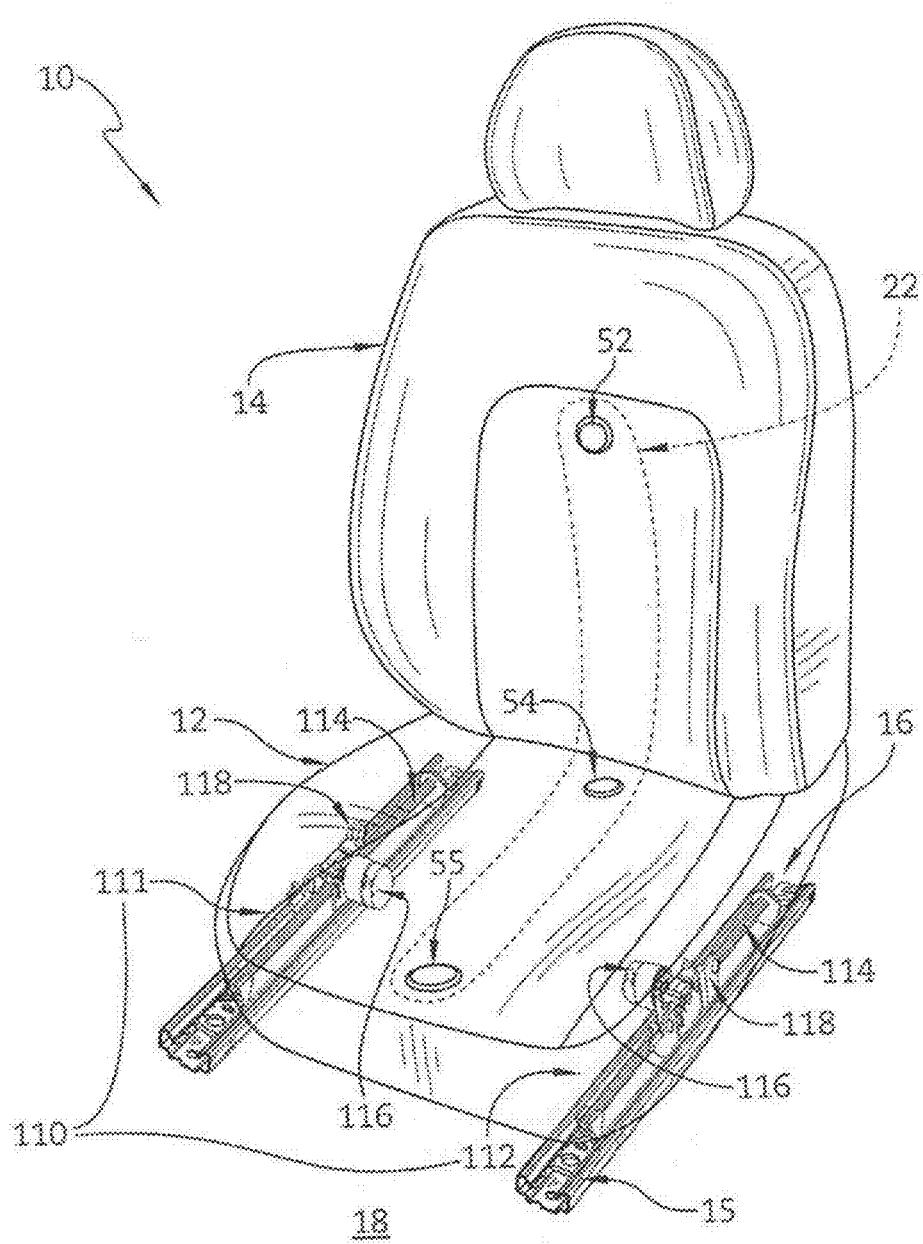

The slide mover 110 is illustratively mounted to the seat bottom 12 and includes a left side assembly 111 and a right side assembly 112 arranged along corresponding sides of the seat bottom 12 as shown in FIG. 3. Each assembly 111, 112 is substantially the same and only the right side assembly 112 is further described. However, the following description of the right side assembly 112 is equally applied to the left side assembly 111.

Figure 4:
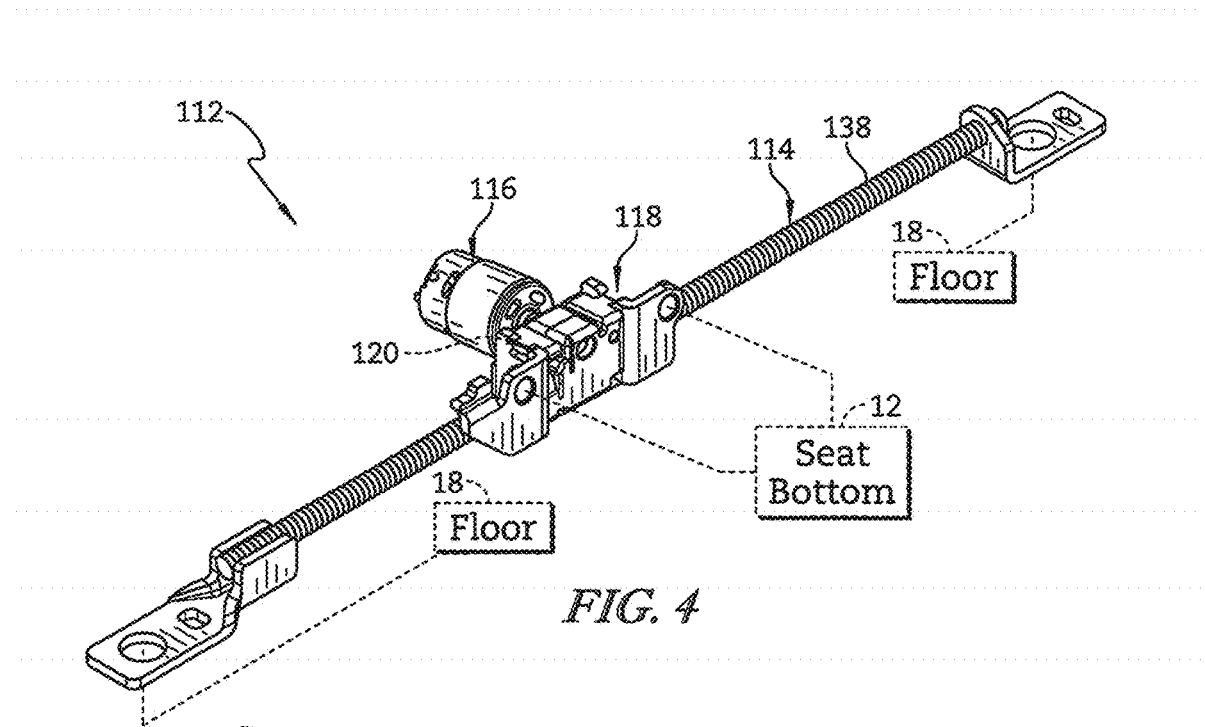
Figure 5:
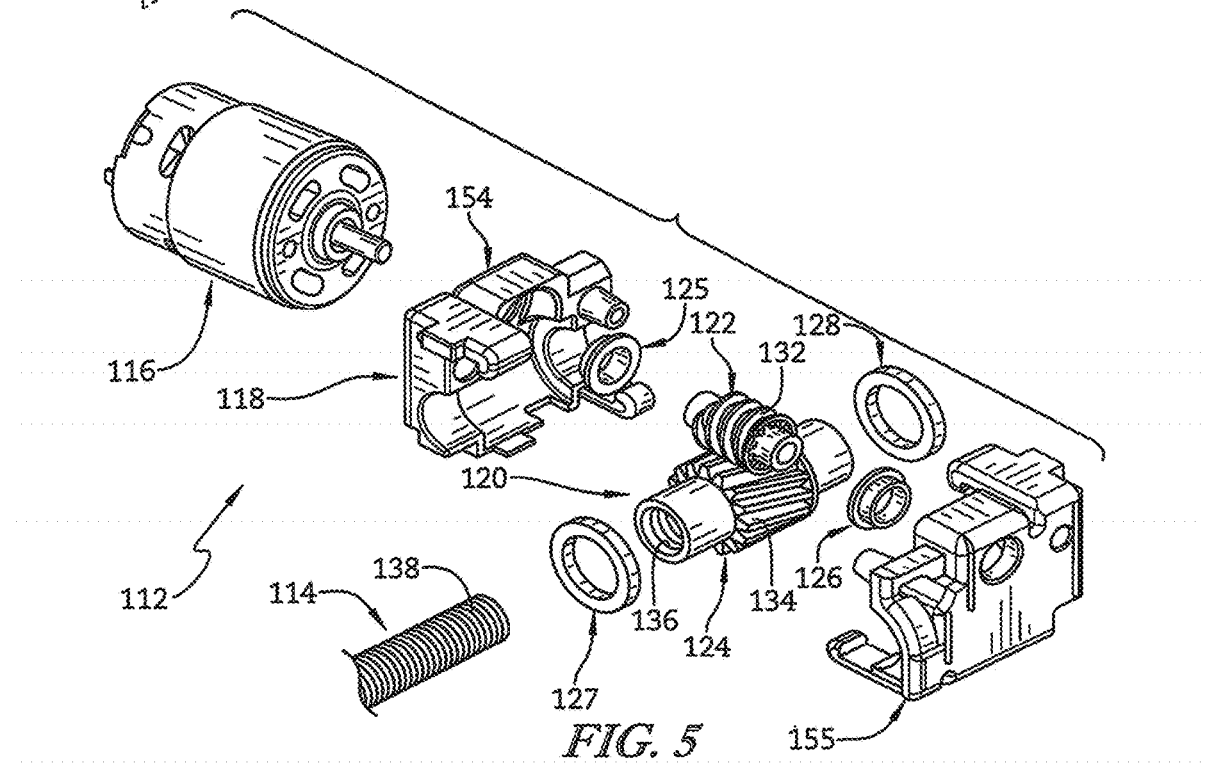

The right side assembly 112 of the slide mover 110 illustratively includes a threaded rod 114 adapted to be coupled to the floor 18 and a motor 116 adapted to be coupled to the seat bottom 12 via a bracket 118 as shown in FIGS. 4 and 5. The right side assembly 112 also includes a worm gear set 120 housed in the bracket 118 that interconnects the threaded rod 114 with the motor 116 so that the bracket 118 (and the seat bottom 12) is moved along the threaded rod 114 (and the floor 18) when the motor 116 rotates.

The worm gear set 120 illustratively includes a worm gear 122 and a worm wheel 124 as shown in FIG. 5. The worm gear 122 is mounted on bushings 125, 126 for rotation within left and right portions 154, 155 of the bracket 118 and is coupled to the motor 116 to be directly driven by the motor 116. The worm wheel 124 is mounted on bushings 127, 128 for rotation within the bracket 118 and is intermeshed with threads 132 of the worm gear 122 to be driven by the worm gear 122. More specifically, the worm wheel 124 has external threads 134 intermeshed with external threads 132 of the worm gear 122 and has internal threads 136 intermeshed with threads 138 of the threaded rod 114. The interaction of the worm gear set 120 with the threaded rod 114 provides braking that blocks the bracket 118 and the passenger support 11 from movement along the floor 18 when the motor 116 is not rotating.

In the illustrative embodiment, the sensor unit 22 includes seat back sensors 52 and seat bottom sensors 54, 55 as shown diagrammatically in FIG. 2 and illustratively in FIG. 3. The seat back sensors 52 are configured to detect forward and rearward slide motion-activation forces 30, 40 applied to the seat back 14 of the vehicle seat 10. The seat bottom sensors 54, 55 are configured to detect forward and rearward slide motion-activation forces 30, 40 applied to the seat bottom 12 of the vehicle seat 10. The seat bottom sensors 54, 55 may also detect if a passenger is supported on the seat bottom 12. The sensors 52, 54, 55 are illustratively force sensors but may be accelerometers, touch sensors, or any other suitable sensor.

Forward slide motion-activation forces 30 illustratively include user interactions such as a push 31, a pull 32, or a gesture 33 as shown in FIG. 2. Similarly, rearward slide motion-activation forces 40 illustratively include user interactions such as a push 41, a pull 42, or a gesture 43 as shown in FIG. 2. In one example, a user may pull forward or push backward with his legs on the seat bottom 12 while seated in the vehicle seat 10 to cause the passenger support 11 to slide forward or rearward along the floor 18 as suggested by arrow 115 in FIG. 1.

In another example, a user may apply a push on the back side 14B of the seat back 14 to cause the passenger support 11 to slide forwardly toward the vehicle front 101 as suggested in FIGS. 21 and 22. In yet another example, a user may apply a push on the front side 14F of the seat back 14 to cause the passenger support 11 to slide rearwardly toward the vehicle back 102 as suggested in FIGS. 23 and 24. In still other examples, a user may apply a gesture like a double tap onto the seat back 12 or seat bottom 14 to cause movement of the passenger support 11 along the floor 18.

In the illustrative embodiment, gestures 33, 43 comprise a predetermined input such as a series of taps, a sequence of pushes and pulls, or the like detected by the sensor unit 22 that cause the seat motion system 16 to take predetermined actions. For example, a double tap on the back side 14B of seat back 14 may result in sliding of the passenger support 11 to a full-forward position. Additional disclosure related to the use of gestures to control motion of the vehicle seat is included in U.S. Pat. App. Ser. No. 61/970,681, filed on Mar. 26, 2014, which is hereby incorporated by reference in its entirety.

Figure 6:
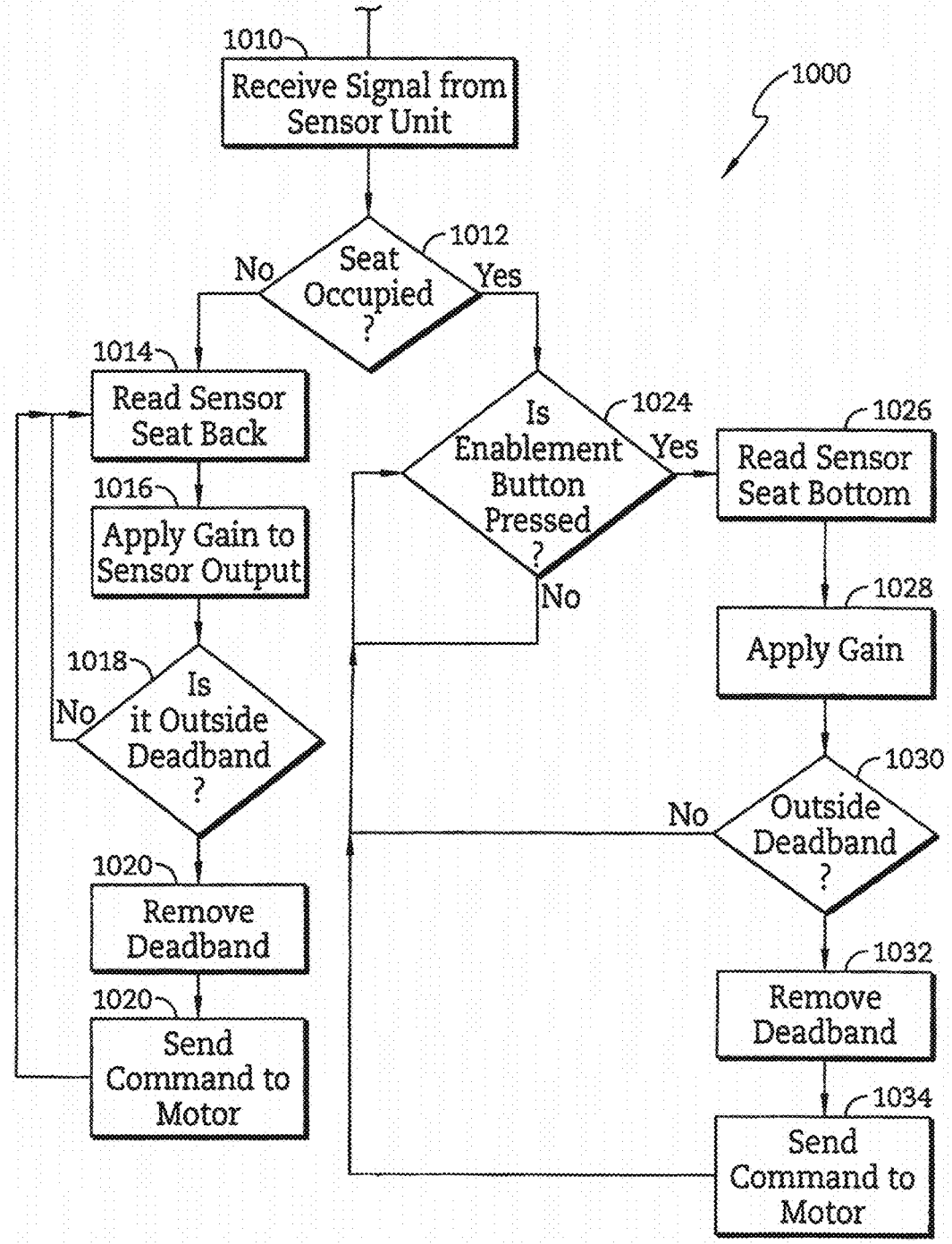
FIG. 6 is a block diagram showing a process performed by the controller included in the seat motion system to operate the slide mover and cause motion of the seat bottom and seat back along the floor.

A process 1000 performed by the controller 24 included in the seat motion system 16 to operate the slide mover 110 and cause motion of the passenger support 11 along the floor 18 is shown in FIG. 6. In a step 1010 of the process 1000, the controller 24 receives signals from the sensors 52, 54, 55 of the sensor unit 22 associated with slide motion-activation forces. Upon receipt of receipt of signals from the sensor unit 22, the controller 24 proceeds to a step 1012 of the process 1000.

In step 1012, the controller 24 determines if the vehicle seat 10 is occupied by a passenger as shown in FIG. 6. In the illustrative embodiment, the controller 24 determines that the vehicle seat 10 is occupied if the seat bottom sensors 54, 55 indicate forces associated with a person sitting on the seat bottom 12. If the vehicle seat 10 is not occupied, the controller 24 will proceed to a step 1014 in order to operate the slide mover 110 in response to forces applied to the seat back 14. If the vehicle seat 10 is occupied, the controller 24 will proceed to a step 1024 in order to operate the slide mover 110 in response to forces applied to the seat bottom 12.

In step 1014, the controller 24 reads seat back sensors 52 to determine the amount of force applied to the front side 14F or the back side 14B of the seat back 14 as suggested in FIG. 6. Then, the controller 24 applies gain to the output of the sensors 52 in a step 1016. After application of the gain in step 1016, the controller 24 determines if the resulting output is outside of a deadband range in a step 1018. If the output is not outside the deadband range, the controller 24 loops back to step 1014. If the output is outside the deadband range, the controller 24 advances to a step 1020 in which the controller 24 accounts for deadband output before sending signals to operate the slide mover 110.

In step 1020, the controller removes the deadband portion of the output received from the total output received as shown in FIG. 6. Thus, the controller 24 to reduces or eliminates oscillation of activation/deactivation by the controller 24. When this portion of the output is removed, the controller 24 proceeds to a step 1022 of the process 1000 and powers the motor 116 to drive the passenger support 11 of the vehicle seat 10 forward or rearward along the floor 18.

Turning back to step 1024, performed if it is determined that the vehicle seat 10 is occupied, the controller 24 determines if the enablement button 61 has been pressed as shown in FIG. 6. By pressing the enablement button 61, the passenger indicates that he is ready to reposition passenger support 11. In other embodiments, other user inputs may be used to indicate that the passenger is ready to reposition the vehicle seat 10. If it is determined that the enablement button 61 has not been pressed, the controller 24 loops back to step 1024 and waits for the button 61 to be pressed. If it is determined that the enablement button 61 has been pressed, the controller 24 advances to a step 1026.

In step 1026, the controller the controller 24 reads seat bottom sensors 54, 55 to determine the amount of force applied to the front side 14F or the back side 14B of the seat back 14 as suggested in FIG. 6. Then, the controller 24 applies gain to the output of the sensors 54, 55 in a step 1028. After application of the gain in step 1028, the controller 24 determines if the resulting output is outside of a deadband range in a step 1030. If the output is not outside the deadband range, the controller 24 loops back to step 1024. If the output is outside the deadband range, the controller 24 advances to a step 1034 in which the controller 24 accounts for deadband output before sending signals to operate the slide mover 110.

In step 1032, the controller removes the deadband portion of the output received from the total output received as shown in FIG. 6. Thus, the controller 24 to reduces or eliminates oscillation of activation/deactivation by the controller 24. When this portion of the output is removed, the controller 24 proceeds to a step 1034 of the process 1000 and powers the motor 116 to drive the passenger support 11 of the vehicle seat 10 forward or rearward along the floor 18.

In some embodiments, the controller 24 may determine if a vehicle drive train is engaged such that the vehicle including the vehicle seat 10 before powering the motor 116 in steps 1022, 1034. In one example, the controller 24 may disallow movement of the passenger support 11 of the vehicle seat 10 along the floor 18 when the vehicle is moving or is moving at a speed above a predetermined threshold. In another example, the controller 24 may disallow movement of the passenger support 11 of the vehicle seat 10 along the floor 18 when a key fob associated with the vehicle is not detected within a predetermined range of the vehicle. In another example, the controller 24 may allow movement of the passenger support 11 of the vehicle seat 10 along the floor 18 only when an enablement button is pressed before or during movement. In yet another example, the controller 24 may disallow movement of the passenger support 11 of the vehicle seat 10 along the floor 18 when a proximity sensor coupled to the controller 24 detects an object blocking movement of the vehicle seat 10.

In the illustrative embodiment, the load cells comprising the sensors 52, 54, 55 of the sensor unit 22 are zeroed during operation of the vehicle seat 10. A rolling average of ~10 values is constantly computed ahead of any state change. When a state change occurs, that rolling average is stopped and the most recent average becomes the value used to compare input signals.

Figure 7:
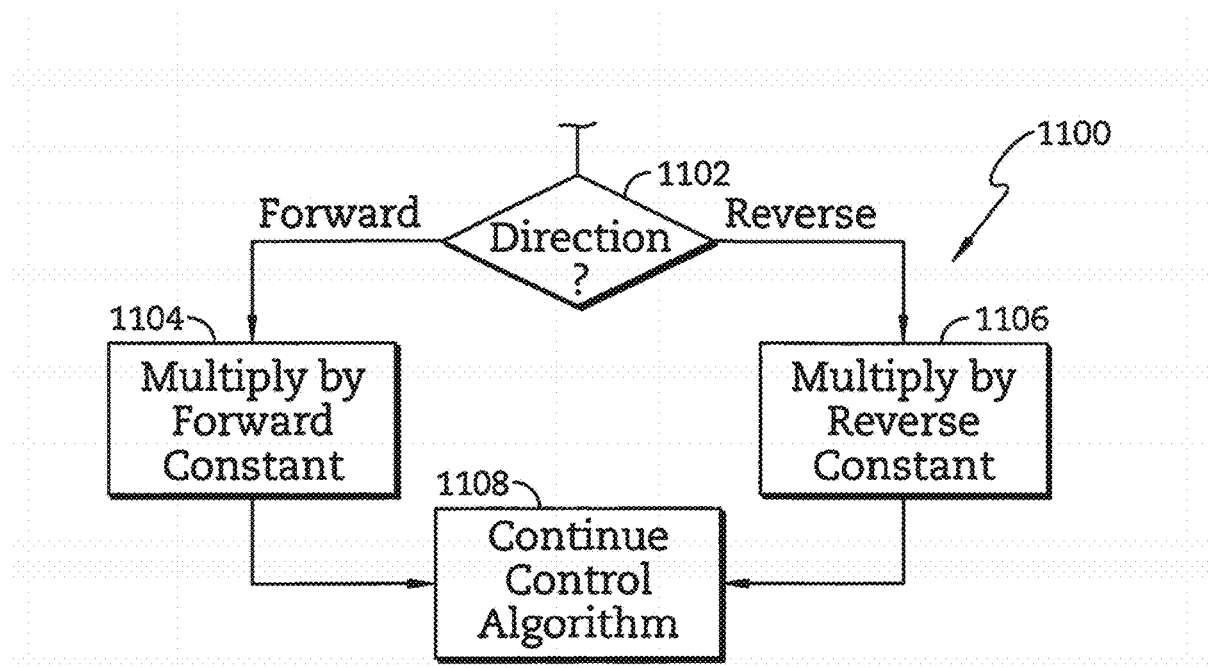
FIG. 7 is a block diagram showing an optional process performed by the controller included in the seat motion system to apply gain to a sensor output when the seat motion system operates the slide mover in response to a user pushing or pulling the seat back.

Turning now to FIG. 7, a process 1100 performed by the controller 24 for applying gain to signals from the sensor unit 22 is shown. The process 1100 takes into account that a passenger is typically able to apply more force pushing the seat bottom 12 rearwardly than pulling the seat bottom 12 forwardly while seated on the seat bottom 12. The process 1100 also takes into account that a passenger is typically able to apply more force pushing the seat back 14 forwardly than pulling the seat back 14 rearwardly when standing adjacent to the vehicle seat 10.

In a step 1102 of the process 1100, the controller 24 determines if the signals received from the sensor unit 22 correspond to forward or reverse movement of the passenger support 11 as shown in FIG. 6. If it is determined that the signals correspond to forward movement of the passenger support, the controller 24 multiplies the received signal by a forward constant in a step 1104. If it is determined that the signals correspond to reverse (rearward) movement of the passenger support, the controller 24 multiplies the received signal by a reverse constant in a step 1106.

Upon multiplication of the signals received, the controller 24 has added sufficient gain to the signals from the sensor unit 22. The controller 24 then proceeds to a step 1108 in which a larger control algorithm (e.g. process 1000) continues.

Figure 8:
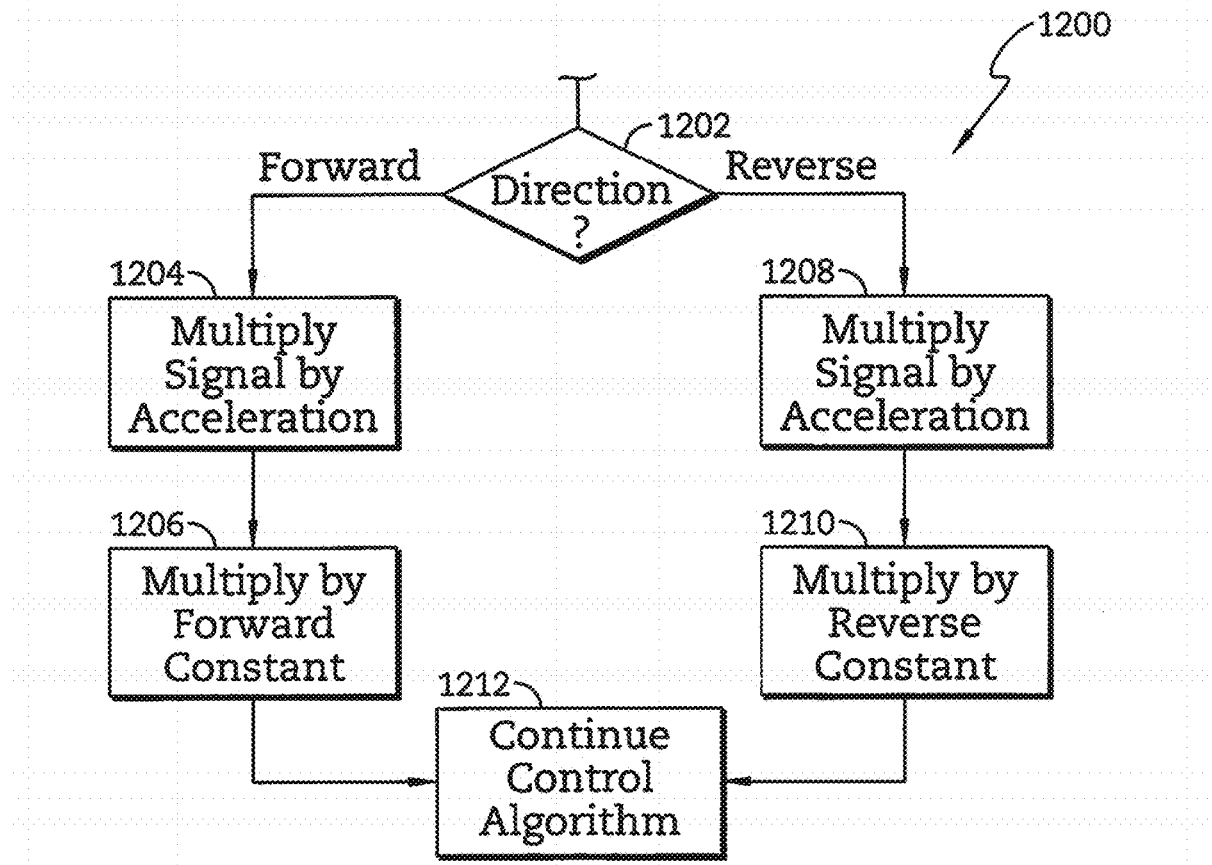
FIG. 8 is a block diagram showing an optional process performed by the controller included in the seat motion system to apply gain to a sensor output when the seat motion system operates the slide mover in response to a user pushing or pulling the seat back.

Turning now to FIG. 8, another process 1200 performed by the controller 24 for applying gain to signals from the sensor unit 22 is shown. The process 1200 takes into account motion of the passenger support 11 to prevent the slide mover 110 from running the passenger support 11 away from the user too quickly. The process 1200 also takes into account that a passenger ability to apply force forwardly and rearwardly onto the seat bottom 12 and/or seat back 14 much like the process 1100 described above. In a step 1202 of the process 1200, the controller 24 determines if the signals received from the sensor unit 22 correspond to forward or reverse movement of the passenger support 11.

If it is determined in step 1202 that the signals correspond to forward movement of the passenger support, the controller 24 multiplies the received signal by acceleration and direction constants as shown in FIG. 6. Particularly, the controller 24 multiplies the received signal by the acceleration of the passenger support 11 in the forward direction in a step 1204 and by a forward constant in a step 1206.

If it is determined in step 1202 that the signals correspond to reverse movement of the passenger support, the controller 24 multiplies the received signal by acceleration and direction constants as shown in FIG. 6. Particularly, the controller 24 multiplies the received signal by the acceleration of the passenger support 11 in the reverse direction in a step 1208 and by a reverse constant in a step 1210.

Upon multiplication of the signals, the controller 24 has added sufficient gain to the signals from the sensor unit 22. The controller 24 then proceeds to a step 1212 in which a larger control algorithm (e.g. process 1000) continues.

Figure 9:
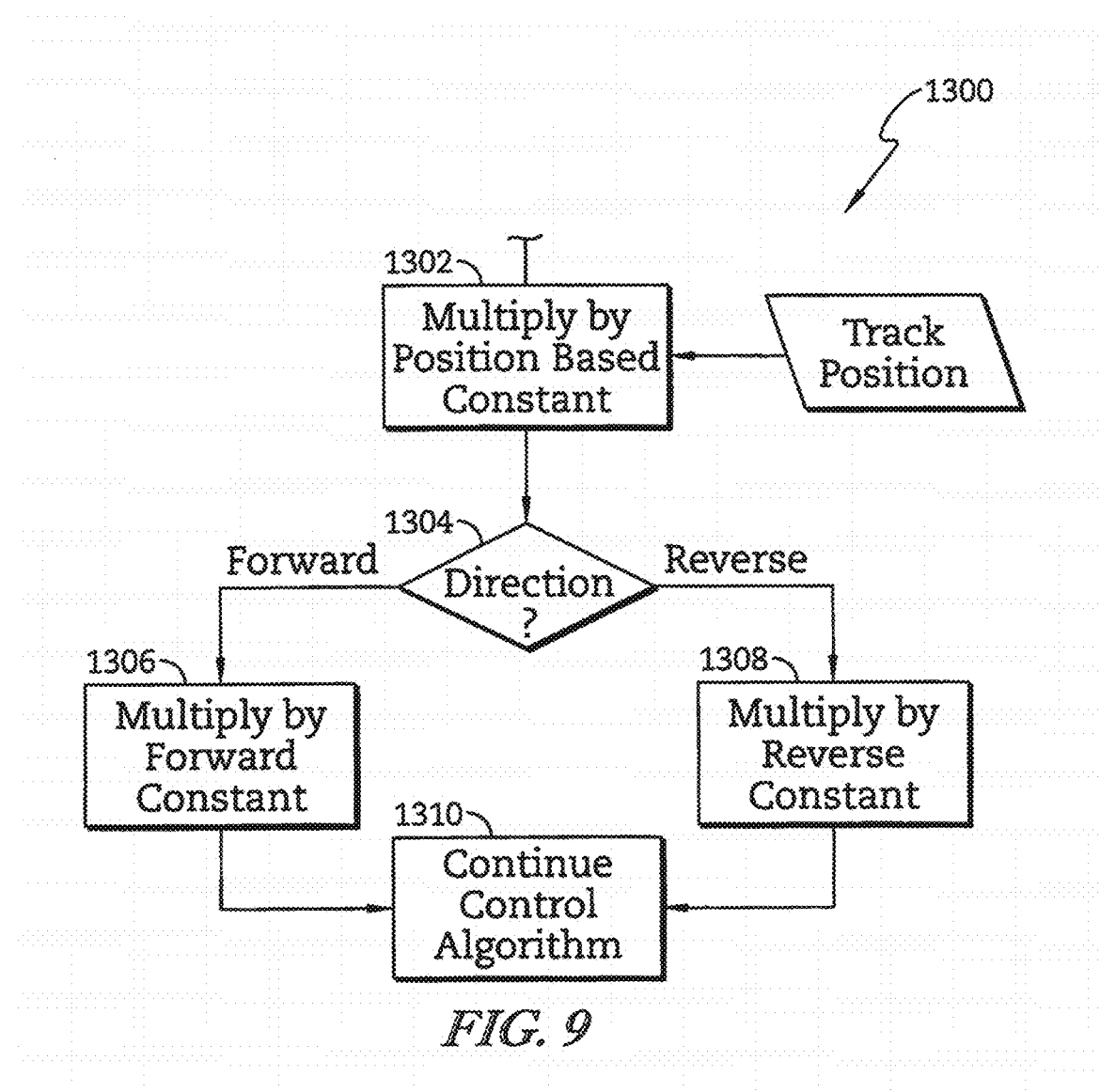
FIG. 9 is a block diagram showing an optional process performed by the controller included in the seat motion system to apply gain to a sensor output when the seat motion system operates the slide mover in response to a user pushing or pulling the vehicle seat while seated.

Turning now to FIG. 9, yet another process 1300 performed by the controller 24 for applying gain to signals from the sensor unit 22 is shown. The process 1300 takes into account the position of the passenger support 11 along the track 15 since passengers are able to apply more force to the seat bottom 12 and/or seat back 14 at different locations along the track 15. The process 1300 also takes into account that a passenger ability to apply force forwardly and rearwardly onto the seat bottom 12 and/or seat back 14 much like the process 1100 described above.

In a step 1302 of the process 1300, the controller 24 multiplies the received signal from the sensor unit 22 by a position constant corresponding to a track position received from the track position sensor 62 as shown in FIG. 9. The controller 24 then performs a step 1304 and determines if the signals received from the sensor unit 22 correspond to forward or reverse movement of the passenger support 11. If it is determined that the signals correspond to forward movement of the passenger support, the controller 24 multiplies the received signal by a forward constant in a step 1306. If it is determined that the signals correspond to reverse (rearward) movement of the passenger support, the controller 24 multiplies the received signal by a reverse constant in a step 1308.

Upon multiplication of the signals received, the controller 24 has added sufficient gain to the signals from the sensor unit 22. The controller 24 then proceeds to a step 1310 in which a larger control algorithm (e.g. process 1000) continues.

A second illustrative slide mover 210 adapted for use in the vehicle seat 10 in place of the slide mover 110 is shown in FIGS. 10 and 11. The slide mover 210 illustratively extends across the seat bottom 12 from a left to a right side 12L, 12R of the seat bottom 12. The slide mover 210 illustratively includes left and right threaded rods 214, 215, a motor 216, brackets 218, 219, worm gear sets 220, 221, and flexible shafts 241, 242 as shown in FIG. 11. The threaded rods 214, 215 are adapted to be coupled to the floor 18 and are arranged in the tracks 15. The motor 216 is spaced between the threaded rods 214, 215 and the brackets 218, 219. The brackets 218, 219 receive the threaded rods 214, 215 and are adapted to be coupled to the seat bottom 12. The worm gear sets 220, 221 are housed in the brackets 218, 219 and engage the threaded rods 214, 215. The flexible shafts 241, 242 extend from the motor 216 to brackets 218, 219 to connect the motor 216 to the worm gear sets 220, 221 within the brackets 218, 219.

The worm gear sets 220, 221 housed in brackets 218, 219 are driven by the motor 216 to move the seat bottom 12 along the threaded rods 214, 215 and along the floor 18 as suggested in FIGS. 10 and 11. Each worm gear set 220, 221 includes a worm gear 222 and a worm wheel 224 as shown in FIG. 11. The worm gear 222 is mounted on bushings 225, 226 for rotation within a corresponding bracket 218, 219 and is coupled to a flexible shaft 241, 242 to be driven by the motor 116. The worm wheel 224 is mounted on bushings 227, 228 for rotation within the corresponding bracket 218 and is intermeshed with threads 232 of a corresponding worm gear 222 to be driven by the worm gear 222. More specifically, the worm wheel 224 has external threads 234 intermeshed with external threads 232 of a corresponding worm gear 222 and has internal threads 236 intermeshed with threads 238 of a threaded rod 214, 215. The interaction of the worm gear set 220 with the threaded rod 214 provides braking that blocks the brackets 218, 219 and the passenger support 11 from movement along the floor 18 when the motor 216 is not rotating.

In the illustrative embodiment, the motor 216 and flexible shafts 241, 242 are mounted in a housing 250 that interconnects the brackets 218, 219 and moves with the seat bottom 12 as shown in FIGS. 10 and 11. The housing 250 has a lower portion 251 and an upper portion 252 that come together to support the motor 216 and shafts 241, 242 for movement with the brackets 218, 219 and the seat bottom 12.

A third illustrative slide mover 310 adapted for use in the vehicle seat 10 in place of the slide mover 110 is shown in FIGS. 12-14. The slide mover 310 is illustratively mounted to the seat bottom 12 and includes a left side assembly 311 and a right side assembly 312 arranged along corresponding sides of the seat bottom 12 as shown in FIG. 12. Each assembly 311, 312 is substantially the same and only the right side assembly 312 is further described. However, the following description of the right side assembly 312 is equally applied to the left side assembly 311.

The right side assembly 312 of the slide mover 310 illustratively includes a bracket 314, a roller 360, a motor 316, and a gear set 320 as shown in FIGS. 12-14. The bracket 314 is adapted to be coupled to the seat bottom 12. The roller 360 is engaged with a rail 15R included in the track 15 underlying the seat bottom 12. The motor 316 is coupled to the bracket 314 and is adapted to drive the roller 360 through the gear set 320.

In the illustrative embodiment, the gear set 320 includes a driver gear 322 and a driven gear 324 as shown in FIGS. 13 and 14. The driver gear 322 is coupled to the motor 316 to be directly driven by the motor 316. The driven gear 324 coupled to the roller 360 for rotation therewith and is intermeshed with the driver gear 322. The gears 322, 324 of the gear set 320 may be sized to step up or step down the speed of the motor 316 as desired.

In some embodiments, the motor 316 may be provide signals to the controller 24 indicative of forces applied by a user to the seat bottom 12 or seat back 14 based on torque applied to the motor 316 by slide motion-activation forces. In such embodiments, the motor 316 provides a sensor 56 that is part of the sensor unit 22.

In the illustrative embodiment, the motors 316 of the slide mover 310 provide braking to hold the passenger support 11 in place along the track 15 as suggested in FIGS. 12-14. In some embodiments a secondary locking mechanism may be incorporated into the slide mover 310 to secure the passenger support 11 in place along the track 15.

A fourth illustrative slide mover 410 adapted for use in the vehicle seat 10 in place of the slide mover 110 is shown in FIGS. 15-17. The slide mover 410 is illustratively mounted to the seat bottom 12 and includes a left side assembly 411 and a right side assembly 412 arranged along corresponding sides of the seat bottom 12 as shown in FIG. 15. Each assembly 411, 412 is substantially the same and only the right side assembly 412 is further described. However, the following description of the right side assembly 412 is equally applied to the left side assembly 411.

The right side assembly 412 of the slide mover 410 illustratively includes a bracket 418, a roller 460, a motor 416, and a gearbox 420 as shown in FIGS. 16 and 17. The bracket 418 is adapted to be coupled to the seat bottom 12 and supports the motor 416 for movement with the seat bottom 12. The roller 460 engages a rail 15R included in the track 15 underlying the seat bottom 12. The motor 416 is coupled to the bracket 418 by pinned connection 419 through a connector bracket 421. Further, the motor 416 is adapted to drive the roller 460 through the gearbox 420.

In the illustrative embodiment, a sensor 456 (e.g. an accelerometer) is coupled to the slide mover 410 to provide signals associated with a slide motion-activation force applied to the vehicle seat 10 as shown in FIGS. 16 and 17. The sensor 456 is included in the sensor unit 22 and is fixed to the connector bracket 421 for movement with the seat bottom 12. Thus, the sensor 456 is able to detect minor movements of the seat bottom 12 associated with a slide motion-activation force. A secondary locking mechanism 470 is illustratively incorporated into the slide mover 410 to secure the passenger support 11 in place along the track 15.

A fifth illustrative slide mover 510 adapted for use in the vehicle seat 10 in place of the slide mover 110 is shown in FIGS. 18-20. The slide mover 510 is illustratively mounted to the seat bottom 12 and includes a flexible belt 514 along which the seat bottom 12 is moved, a motor 516, a bracket 518, and rollers 560, 561, 562. The flexible belt 514 is adapted to be coupled to the floor 18. The bracket 518 includes two plates 591, 592 and is coupled to the seat bottom 12. The motor 516 is coupled to the bracket 518 for movement with the seat bottom 12. The rollers 560, 561, 562 are mounted between the plates 591, 592 of the bracket 518 to rotate relative to the bracket 518 and are engaged with the belt 514 to move the motor 516, bracket 518, and seat bottom 12 along the belt 514 and the floor 18.

In the illustrative embodiment, a drive roller 560 is coupled to the motor 516 via a gearbox 520 and rotation of the drive roller 560 is driven by the motor 516 as shown in FIGS. 19 and 20. The drive roller 560 has a plurality of external teeth 594 that engage teeth 596 formed on one side of the belt 514. Guide rollers 561, 562 engage the belt 514 before and after the drive roller 560 on a smooth side 598 of the belt 514 to cause a predetermined length of the belt 514 to engage the drive roller 560.

In the illustrative embodiment, sensor 556, 558 (e.g. force sensors) are coupled to each end of the belt 514 to provide signals associated with a slide motion-activation force applied to the vehicle seat 10 as shown in FIGS. 19 and 20. The sensors 556, 558 are included in the sensor unit 22 and may replace or augment signals from the seat bottom sensors 54, 55. A secondary locking mechanism 570 is illustratively incorporated into the slide mover 510 to secure the passenger support 11 in place along the track 15. The secondary locking mechanism 570 is a mechanical lock spaced apart from/independent of the belt 514 and coupled to the controller to selectively secure or release the passenger support 11 along the track 15.

Another embodiment of a left side unit 611 in accordance with the present disclosure is shown in FIGS. 26-31. Left side unit 611 may be used with a right side unit (not shown) in a slide mover. Left side unit 611 includes a threaded rod 614 (also called lead screw 614) adapted to be coupled to a floor (not shown) and a motor 616 adapted to be coupled to a seat bottom of a vehicle seat. Motor 616 is coupled to the seat bottom by a bracket 618 (also called housing 618) to cause the vehicle seat to move back and forth relative to the floor and threaded rod 614 in response to forces applied to the vehicle seat as suggested in FIG. 1.

Left side unit 611 further includes a worm gear set 620, a flex coupling 640, and an encoder 642 as shown in FIG. 27. Worm gear set 620 includes a worm gear 622 coupled to motor 616 and a worm wheel 624 coupled to threaded rod 614. Flex coupling 640 is coupled to motor 616 between motor 616 and worm gear 622 as shown in FIG. 26. Flex coupling 640 is configured to minimize damage to worm set 620 from motor startup and binding of components in worm set 620. While flex coupling 640 is shown in FIG. 26, a deformable housing may also be used in place of flex coupling 640. Encoder 642 is coupled to motor 616 and configured to provide motor-position feedback to controller 24 included in a seat motion system. While encoder 642 is shown in FIG. 26, motor-position sensing may be performed in motor 616 to provide a track position sensor (i.e. sensor 62) to be used as described herein.

Motor-position feedback may be used to provide soft stops or stored memory locations for the vehicle seat. A soft stop is a stop or limit achieved by programming included in the controller. A stored memory location is a stop or limit achieved by storing a location in memory included in the controller and then commanding the vehicle seat stop when the stored location is sensed. In one example, the soft stop may be identified as occurring just prior to the actual end of travel for the vehicle seat so as to minimize damage to the vehicle seat from abruptly stopping at the end of travel. In another example, the motor-position feedback may be used to slow movement of the vehicle seat as the seat approaches the soft stops or the stored memory location so as to provide an improved user experience. Motor-position feedback may also be used to provide the sensation of inertia or momentum to the user as the user moves the vehicle seat. Motor behavior may be tuned to provide predetermined user experiences using the motor-position feedback.

Left side unit 611 further includes a bracket 618 as shown in FIG. 27. Bracket 618 includes a mounting plate 644, a backing plate 646, and bolts 648 as shown in FIG. 27. Mounting plate 644 is arranged to support motor 616 and encoder 642 in a fixed position relative to the vehicle seat.

Backing plate 646 is spaced apart from mounting plate 644 as shown in FIG. 27. Bolts 648 are arranged to extend between and interconnect mounting plate 644 and backing plate 646. A pair of flexures 650 are coupled to mounting plate 644 as shown in FIG. 27. A pair of associated load cells 652 are coupled to flexures 650 and configured to sense longitudinal load applied to the vehicle seat and communicate the sensed load to the controller as suggested in FIG. 2;

Bracket 618 further includes a retainer plate 654 and a pair of retainer bolts 656 as shown in FIGS. 29 and 30. Retainer plate 654 is arranged to lie in spaced-apart relation to flexures 650 to locate flexures 650 between retainer plate 654 and motor 616 as shown in FIG. 29. Retainer bolts 656 couple retainer plate 654 to mounting plate 644 as suggested in FIGS. 29 and 30.

In one example, each flexure 650 is piece of material arranged to extend vertically down from a top coupling point to mounting plate 650 to a lower coupling point to a retainer plate 652 as suggested in FIGS. 28 and 29. Each flexure 650 is configured to have a width and a thickness sufficient to provide means for deforming in a desired manner to cause an associated load cell 652 coupled to flexure 650 to deform and provide a signal indicative of a force applied to the vehicle seat so that the controller can command motor 616 to move in a predetermined manner in response to the sensed force. In one example, the material is aluminum. In another example, the material is a glass filled polymer material. In another example, the material has thermal properties sufficient to withstand temperature variations experienced inside a vehicle cabin and still provide sufficient dimensional tolerance so that the load cells function as desired.

In one example, load cells 652 cooperate to provide a sensor unit in accordance with the present disclosure. Load cells 652 may be used in place of or in cooperation with seat back sensors 52 and seat bottom sensors 54, 55. Thus, load cells 652 may provide the signal which is used in process 100 as suggested in FIGS. 6-9.

Another embodiment of a left side unit 711 in accordance with the present disclosure is shown in FIGS. 32-35. Left side unit 711 may be used with a right side unit (not shown) in a slide mover. Left side unit 711 includes a threaded rod 714 adapted to be coupled to a floor (not shown) and a motor 716 adapted to be coupled to a seat bottom of a vehicle seat. Motor 716 is coupled to the seat bottom by a bracket 718 to cause the vehicle seat to move back and forth relative to the floor and threaded rod 714 in response to forces applied to the vehicle seat as suggested in FIG. 1;

Left side unit 711 further includes a worm gear set 720, a flex coupling 740, and an encoder 742 as shown in FIG. 35. Worm gear set 720 includes a worm gear 722 coupled to motor 716 and a worm wheel 724 coupled to threaded rod 714. Flex coupling 740 is coupled to motor 716 between motor 716 and worm gear 722 as shown in FIG. 34. Flex coupling 740 is configured to minimize damage to worm set 720 from motor startup and binding of components in worm set 720. While flex coupling 740 is shown in FIG. 26, a deformable housing may also be used in place of flex coupling 740. Encoder 742 is coupled to motor 716 and configured to provide motor-position feedback to controller 24 included in a seat motion system. While encoder 742 is shown in FIGS. 32 and 33, motor-position sensing may be performed in motor 716.

Left side unit 711 further includes a bracket 718 as shown in FIG. 35. Bracket 718 includes a mounting plate 744, a backing plate 746, and bolts 748 as suggested in FIG. 35. Mounting plate 744 is arranged to support motor 716 and encoder 742 in a fixed position relative to the vehicle seat. Backing plate 746 is spaced apart from mounting plate 744 as shown in FIG. 35. Bolts 748 are arranged to extend between and interconnect mounting plate 744 and backing plate 746. A pair of flexures 750 are coupled to mounting plate 744 as shown in FIG. 35. A pair of associated load cells (not shown) are coupled to flexures 750 and configured to sense longitudinal load applied to the vehicle seat and communicate the sensed load to the controller as suggested in FIG. 2.

In one example, each flexure 750 is piece of material arranged to extend vertically down from a top coupling point to mounting plate 750 to a lower coupling point to a retainer plate 752 as suggested in FIG. 35. Each flexure 750 is configured to have a width and a thickness sufficient to provide means for deforming in a desired manner to cause an associated load cell coupled to flexure 750 to deform and provide a signal indicative of a force applied to the vehicle seat so that the controller can command motor 716 to move in a predetermined manner in response to the sensed force.

While some examples of the present disclosure are directed toward specifically directed toward a vehicle seat in a specific row (front-row vehicle seat, second-row vehicle seat, etc.) the teaching herein may be equally applicable to vehicle seats arranged in any row of a passenger vehicle. Also, while the vehicle seats of the present disclosure are arranged in an automotive vehicle environment, the teaching herein may be equally applicable vehicle seats in other environments (e.g. boats, airplanes, trains, amusement rides, etc.). Further, such seats may also be used outside of vehicle environments (e.g. movie theaters, stadiums, etc.) without departing from the scope of this disclosure.

The invention claimed is:

1. A vehicle seat comprising
a seat bottom adapted to be bracketed to a floor to slide along the floor,
a seat back coupled to the seat bottom, and
powered means for rearranging the vehicle seat by sliding the seat bottom along the floor in response to a user applying a force onto any location on the seat back or onto any location on the seat bottom in a direction of movement while seated in the vehicle seat, the applied force sensed by a sensor unit, so that the vehicle seat is rearranged to allow for passenger entry or to accommodate passenger location preference without requiring the user to manually overcome all frictional and gravitational forces resisting the direction of movement of the vehicle seat.

2. The vehicle seat of claim 1, wherein the powered means further includes a slide mover configured to move the seat bottom along the floor, and a controller coupled to the slide mover and the sensor unit and the controller is configured to activate the slide mover in response to inputs received from the sensor unit.

3. The vehicle seat of claim 2, wherein the controller is configured to receive signals indicative of forces applied to front and back sides of the seat back from the sensor unit and is configured to activate the slide mover in response.

4. The vehicle seat of claim 2, wherein the controller is configured to receive signals indicative of forces applied to the seat bottom and indicative of a passenger seated in the vehicle seat and is further configured to activate the slide mover in response.

5. The vehicle seat of claim 4, wherein the controller is configured to receive a signal associated with non-engagement of a vehicle drive and the controller is further configured to activate the slide mover in response to receipt of signals indicative of forces applied to the seat bottom only after receipt of the signal associated with non-engagement of a vehicle drive.

6. The vehicle seat of claim 2, wherein the controller is configured to receive signals indicative of forces applied to front and back sides of the seat back from the sensor unit, the controller is configured to receive signals indicative of forces applied to the seat bottom, and the controller is configured to activate the slide mover in response to the signals received.

7. A vehicle seat comprising
a seat bottom adapted to be bracketed to a floor to slide along the floor,
a seat back coupled to the seat bottom, and
powered means for rearranging the vehicle seat by sliding the seat bottom along the floor in response to a user applying a force onto the seat back or onto the seat bottom while seated in the vehicle seat so that the vehicle seat is rearranged to allow for passenger entry or to accommodate passenger location preference without requiring the user to manually overcome all frictional and gravitational forces resisting movement of the vehicle seat,
wherein the powered means includes a slide mover configured to move the seat bottom along the floor, a sensor unit, and a controller coupled to the slide mover and the sensor unit and the controller is configured to activate the slide mover in response to inputs received from the sensor unit,
wherein the controller is configured to receive signals indicative of forces applied to front and back sides of the seat back from the sensor unit, the controller is configured to receive signals indicative of forces applied to the seat bottom, and the controller is configured to activate the slide mover in response to the signals received, and
wherein the controller is configured to multiply the signals by different coefficients to apply gain to the signals, the coefficients depending on (i) whether the vehicle seat is pushed forward or pulled backward, (ii) whether the force signals are associated with a force applied to the seat bottom or the seat back, or (iii) whether the location of the vehicle seat relative to the floor and the controller is configured to operate the slide mover based on the signals after gain is applied.

8. The vehicle seat of claim 4, wherein the powered means includes an enablement unit coupled to the controller, the controller is configured to receive a user input associated with release of the vehicle seat to slide along the floor from the enablement unit, and the controller is further configured to activate the slide mover in response to receipt of signals indicative of forces applied to the seat bottom only after receipt of the user input associated with release of the vehicle seat.

9. The vehicle seat of claim 1, wherein the seat bottom and the seat back are free of electronic user input buttons, switches, and levers associated with movement of the seat bottom along the floor.

10. The vehicle seat of claim 1, wherein the powered means includes a seat motion system including a slide mover configured to move the seat bottom along the floor, the sensor unit configured to detect forward or rearward forces applied to at least one of the seat bottom and seat back, and a controller coupled to the slide mover and the sensor unit, wherein the controller is configured to activate the slide mover in response to inputs received from the sensor unit.

11. The vehicle seat of claim 10, wherein the slide mover includes a threaded rod adapted to be coupled to the floor, a motor coupled to the seat bottom, a worm gear coupled to the motor to be driven by the motor, and a worm wheel having external threads intermeshed with the worm gear and internal threads intermeshed with the threaded rod.

12. The vehicle seat of claim 11, wherein the slide mover includes a flexible shaft that interconnects the motor with the worm gear.

13. The vehicle seat of claim 10, wherein the slide mover includes a motor coupled to the bracket and a roller coupled to the motor to be driven by the motor.

14. The vehicle seat of claim 13, wherein the slide mover includes a gear set coupled between the motor and the roller.

15. The vehicle seat of claim 13, further comprising a slide lock coupled to the seat bottom and configured to block or allow movement of the seat bottom relative to the rail.

16. The vehicle seat of claim 13, wherein the sensor unit includes a load sensor coupled to the bracket of the slide mover and configured to detect forward or rearward force applied to the seat bottom.

17. The vehicle seat of claim 10, wherein the slide mover includes a flexible belt adapted to be coupled to the floor, a bracket coupled to the seat bottom, a motor coupled to the bracket, and a drive roller coupled to the motor to be driven by the motor and engaged with the flexible belt.

18. The vehicle seat of claim 17, wherein the slide mover includes at least one tension roller coupled to the bracket and engaged with the flexible belt.

19. The vehicle seat of claim 17, wherein the sensor unit includes a load sensor coupled to the flexible belt.

20. The vehicle seat of claim 17, further comprising a slide lock coupled to the seat bottom and configured to block or allow movement of the seat bottom relative to a rail underlying the seat bottom.

21. The vehicle seat of claim 10, wherein the seat motion system further includes a track position sensor configured to detect the location of the seat bottom relative to floor and wherein the controller is configured to multiply inputs received from the sensor unit based on the location of the seat bottom relative to the floor thereby adjusting the speed at which the seat bottom is moved along the floor by the slide mover in response to a given input received from the sensor unit.

22. The vehicle seat of claim 21, wherein the track position sensor includes an encoder is coupled to a motor included in the slide mover and configured to provide motor-position feedback to the controller which corresponds to location of the seat bottom relative to the floor.

23. The vehicle seat of claim 22, wherein slide mover includes a bracket configured to support motor and encoder in a fixed position relative to the seat bottom.

24. The vehicle seat of claim 23, wherein a pair of flexures are coupled to the mounting plate and a pair of associated load cells are coupled to the flexures and wherein the load cells are configured to sense longitudinal load applied to the seat bottom and communicate the sensed load to the controller.

25. The vehicle seat of claim 10, wherein the seat bottom and the seat back are free of electronic user input buttons, switches, and levers associated with movement of the seat bottom along the floor.

* * * * *